United States Patent
Sano et al.

(10) Patent No.: US 7,577,279 B2
(45) Date of Patent: Aug. 18, 2009

(54) IDENTITY VERIFICATION APPARATUS AND FINGERPRINT IMAGE PICKUP METHOD

(75) Inventors: Emiko Sano, Tokyo (JP); Akihide Shiratsuki, Tokyo (JP); Masahiro Shikai, Tokyo (JP); Hajime Nakajima, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 817 days.

(21) Appl. No.: 10/793,747

(22) Filed: Mar. 8, 2004

(65) Prior Publication Data

US 2004/0179723 A1    Sep. 16, 2004

(30) Foreign Application Priority Data

Mar. 13, 2003    (JP) .............................. 2003-067767
Feb. 5, 2004    (JP) .............................. 2004-029169

(51) Int. Cl.
*G06K 9/00*    (2006.01)
*G06K 9/40*    (2006.01)

(52) U.S. Cl. ........................................ 382/124; 382/260
(58) Field of Classification Search ................. None
See application file for complete search history.

(56) References Cited

U.S. PATENT DOCUMENTS

| | | | |
|---|---|---|---|
| 4,932,776 A | | 6/1990 | Dowling, Jr. et al. |
| 4,936,680 A | * | 6/1990 | Henkes et al. .................. 356/71 |
| 5,096,290 A | | 3/1992 | Ohta |
| 5,426,296 A | | 6/1995 | Shikai et al. |
| 5,456,256 A | * | 10/1995 | Schneider et al. ............ 600/445 |
| 5,638,818 A | * | 6/1997 | Diab et al. .................... 600/476 |
| 5,878,157 A | * | 3/1999 | Mukohzaka ................ 382/124 |
| 5,982,914 A | * | 11/1999 | Lee et al. ..................... 382/124 |
| 6,061,583 A | * | 5/2000 | Ishihara et al. ............... 600/322 |
| 6,657,185 B2 | | 12/2003 | Shiratsuki et al. |
| 6,806,483 B2 | | 10/2004 | Iihama et al. |
| 2002/0131622 A1 | * | 9/2002 | Lee et al. ..................... 382/106 |
| 2003/0020028 A1 | * | 1/2003 | Iihama et al. ................ 250/556 |

(Continued)

FOREIGN PATENT DOCUMENTS

CN    1400666 A    3/2003

(Continued)

OTHER PUBLICATIONS

"Near, Mid, & Far Infrared" <http://www.ipac.caltech.edu/Outreach/Edu/Regions/irregions.html> available since Jan. 25, 2001.*

*Primary Examiner*—Charles Kim
(74) *Attorney, Agent, or Firm*—Leydig, Voit & Mayer, Ltd.

(57) ABSTRACT

An identity verification apparatus includes a light source for applying light that can pass through an object to be detected and having a fingerprints to the object to be detected, an image pickup unit for picking up light emitted from the light source and passing through projections of the fingerprint and light emitted from the light source and passing through depressions of the fingerprint, and for generating a fingerprint image including dark portions corresponding to the projections and bright portions corresponding to the depressions, and a signal processing unit for image processing the fingerprint image generated by the image pickup unit to generate fingerprint information, and for verifying an identity based on the fingerprint information.

10 Claims, 11 Drawing Sheets

U.S. PATENT DOCUMENTS

| | | | |
|---|---|---|---|
| 2003/0063783 A1* | 4/2003 | Higuchi | 382/125 |
| 2005/0254695 A1* | 11/2005 | Nagasaka et al. | 382/126 |
| 2007/0003114 A1* | 1/2007 | Hendriks et al. | 382/124 |

FOREIGN PATENT DOCUMENTS

| | | |
|---|---|---|
| DE | 38 34 046 | 4/1990 |
| DE | 44 04 918 C2 | 8/1994 |
| DE | 195 35 803 A1 | 3/1997 |
| DE | 198 37 429 | 2/2000 |
| EP | 0 304 092 B1 | 12/1999 |
| JP | 4-271478 A | 9/1992 |
| JP | 7-21373 A | 1/1995 |
| JP | 9-134419 | 5/1997 |
| JP | 9-134419 A | 5/1997 |
| JP | 10-143663 A | 5/1998 |
| JP | 10-334237 | 12/1998 |
| JP | 2003-85538 A | 3/2003 |

* cited by examiner

IDENTITY VERIFICATION APPARATUS AND FINGERPRINT IMAGE PICKUP METHOD

BACKGROUND OF THE INVENTION

1. Field of the Invention

The present invention relates to an identity verification apparatus and a fingerprint image pickup method. More particularly, it relates to an identity verification apparatus for and a fingerprint image pickup method of generating a good-quality fingerprint image regardless of the moisture condition on the skin of the fingerprint and when the projections and depressions of the fingerprint cannot be clearly recognized, thereby improving the performance of identity verification.

2. Description of Related Art

In accordance with prior art identity verification apparatus and fingerprint image pickup methods, the fingerprint of a fingertip is brought into contact with a contact surface of a transparent contactable prism, and the back side of the fingertip is irradiated with light emitted out of a light source for lighting. The light incident upon the back side of the fingertip is scattered by the inside of the fingertip which is an outstanding light scattering object, and illuminates the fingerprint from the inner side of the fingertip with uniform light intensity. Since light rays emitted out of the fingerprint ridge portions and the fingerprint valley portions are incident upon the prism at their respective different angles on an interface between the air and the contact surface of the prism, arrangement of an image pickup device in a direction of the light emitted out of the fingerprint ridge portions, i.e., in a direction with an angle larger than the critical angle of total reflection of the interface between the air and the contact surface of the transparent contactable prism can provide a good-contrast picked-up fingerprint image (see Japanese patent application publication (TOKKAIHEI) No. 9-134419 (pages 3 to 4 and FIGS. 1 to 3), for example)

However, since such a prior art identity verification apparatus and a fingerprint image pickup method utilize changes in the angle of light incident upon the prism, the changes depending upon the presence or absence of the air between the contact surface and the fingertip, the degree of contact between the skin of the fingerprint and the contact surface of the prism changes largely according to the condition of the fingerprint side surface of the finger, such as the wet condition of the skin due to sweat, oil, or water, and the condition of the air between the contact surface and the finger also changes according to the condition of the fingerprint side surface of the finger. As a result, the quality of the generated fingerprint image changes according to the moisture condition of the skin of the fingertip, and therefore the performance of identity verification degrades. For example, when the skin of the fingertip is dry, since the projections of the fingerprint are not fully in contact with the contact surface of the prism, the projections of the fingerprint are hard to distinguish from the depressions of the fingerprint in the fingerprint image. In a case where the projections and depressions of the fingerprint cannot be clearly recognized due to wear or the like, there is a possibility that the performance of identity verification degrades and identity verification cannot be carried out.

SUMMARY OF THE INVENTION

The present invention is made in order to solve the above-mentioned problems, and it is therefore an object of the present invention to provide an identity verification apparatus for and a fingerprint image pickup method of generating a good-quality fingerprint image without being affected by the surface state of the fingerprint, thereby improving the performance of identity verification.

In accordance with an aspect of the present invention, there is provided an identity verification apparatus including a light source for applying light that can pass through an object to be detected having a fingerprint to the object to be detected, an image pickup unit for picking up both light emitted out of the light source and passing through projections of the fingerprint and light emitted out of the light source and passing through depressions of the fingerprint, and for generating a fingerprint image including dark portions corresponding to the projections and bright portions corresponding to the depressions, and a signal processing unit for performing image processing on the fingerprint image generated by the image pickup unit so as to generate fingerprint information, and for verifying an identity based on the fingerprint information.

Therefore, the aspect of the present invention offers an advantage of being able to generate a good-quality fingerprint image without being affected by the surface state of the fingerprint, thereby improving the performance of identity verification.

In accordance with another aspect of the present invention, there is provided an identity verification apparatus including a light source for applying light that can pass through an object to be detected having a fingerprint to the object to be detected, a fingerprint side surface of the object to be detected, which is an object to be detected, being in noncontact with any structure, an image pickup unit for picking up both light emitted out of the light source and passing through projections of the fingerprint and light emitted out of the light source and passing through depressions of the fingerprint, and for generating a fingerprint image including dark portions corresponding to the projections and bright portions corresponding to the depressions, and a signal processing unit for performing image processing on the fingerprint image generated by the image pickup unit so as to generate fingerprint information, and for verifying an identity based on the fingerprint information.

Therefore, the other aspect of the present invention offers an advantage of being able to generate a good-quality fingerprint image without being affected by the surface state of the fingerprint, thereby improving the performance of identity verification.

In accordance with a further aspect of the present invention, there is provided a fingerprint image pickup method including the steps of applying light that can pass through an object to be detected having a fingerprint to the object to be detected, and generating a fingerprint image corresponding to light transmittance of internal tissues that are close to a fingerprint side surface of the object to be detected.

Therefore, the further aspect of the present invention offers an advantage of being able to generate a good-quality fingerprint image without being affected by the surface state of the fingerprint, thereby improving the performance of identity verification.

Further objects and advantages of the present invention will be apparent from the following description of the preferred embodiments of the invention as illustrated in the accompanying drawings.

DETAILED DESCRIPTION OF THE PREFERRED EMBODIMENTS

The inventors of the present invention found out that internal tissues in the vicinity of the fingerprint side surface of a fingertip has an optical property corresponding to the projection and depression pattern of the fingerprint, and the internal tissues have first portions corresponding to the fingerprint crests (i.e., projections) and second portions corresponding to the fingerprint troughs (i.e., depressions), the fingerprint crests having lower transmittance than the fingerprint troughs. That is, the distribution of intensity of light passing through those internal tissues represents the projection and depression pattern of the fingerprint.

The present invention is made by focusing on these characteristics, and the present invention is characterized in that a distribution of the intensity of light passing through internal tissues having an optical property corresponding to the projection and depression pattern of the fingerprint is detected.

The internal tissues having an optical property corresponding to the projection and depression pattern of the fingerprint are at a distance ranging from about 0.1 mm to about 1.0 mm from the fingerprint side surface of the fingertip. That is, the internal tissues are located in an inner region of the fingertip, the region extending from a location at a distance of about 0.1 mm from the fingerprint side surface to a location at a distance of about 1.0 mm from the fingerprint side surface. The internal tissues can exist at a distance of 1.0 mm or more from the fingerprint side surface, depending upon variations among individuals.

Embodiment 1

Figure 1:
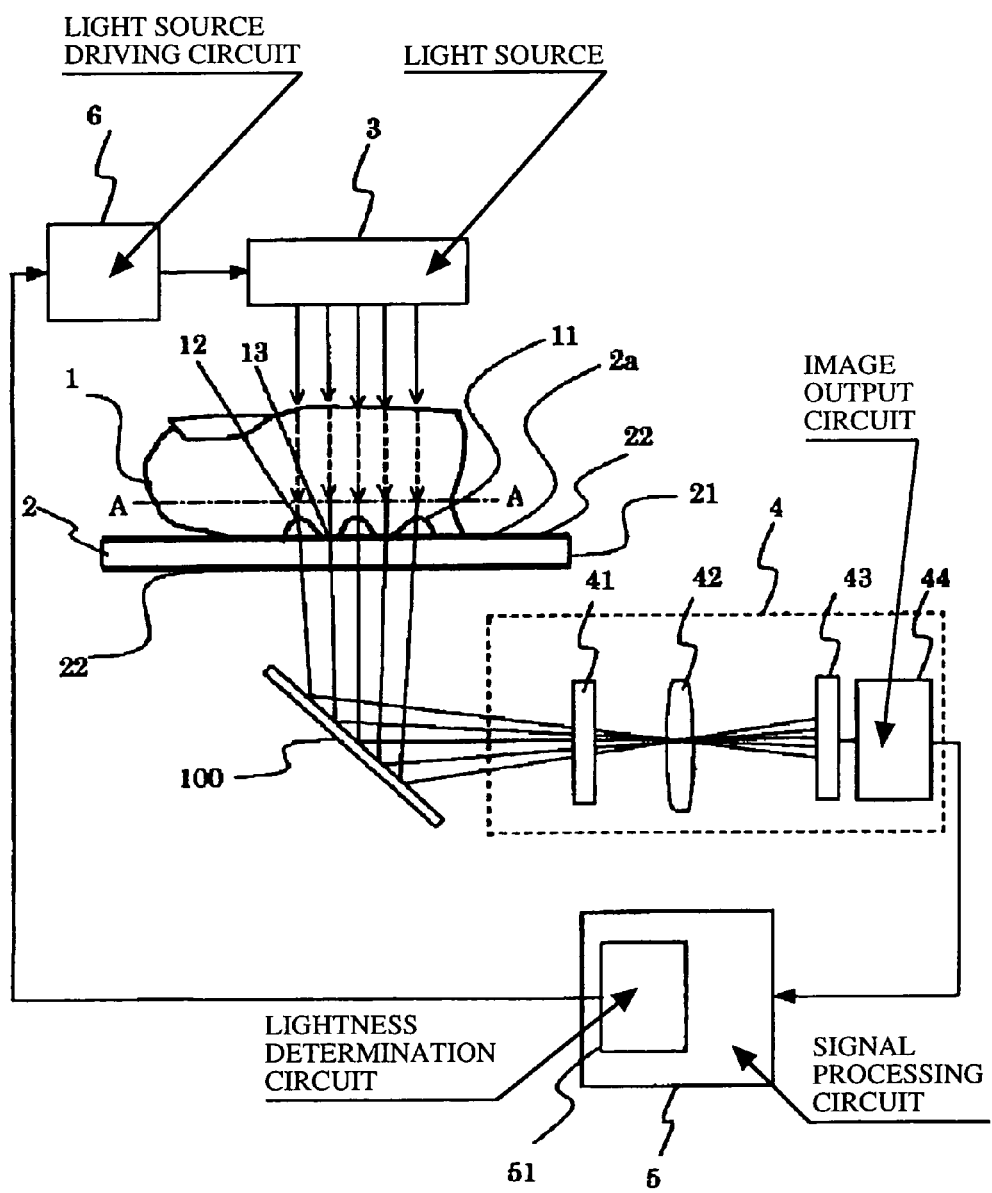
FIG. 1 is a diagram for explaining an identity verification apparatus and a fingerprint image pickup method according to embodiment 1 of the present invention.

FIG. 1 is a diagram for explaining an identity verification apparatus and a fingerprint image pickup method according to embodiment 1 of the present invention, and, more concretely, is a side elevation showing the structure of the whole of the identity verification apparatus. In FIG. 1, a fingertip 1 corresponding to an object to be detected has a fingerprint 11, and the fingerprint 11 has a projection and depression pattern that consists of projections (i.e., crests) 13 and depressions (i.e., troughs) 12. In accordance with the present invention, the fingertip 1 does not refer to an end part of a finger, but refers to a part extending from the end part to a neighborhood of the first joint or the second joint of the finger. A transparent object-to-be-detected holding member 2 that can hold the fingertip 1 with the fingerprint 11 of the finger being in contact with the transparent object-to-be-detected holding member 2 is provided with a transparent board 21. The transparent board 21 has antireflection films 22, as a reflection preventing means, on both a contact surface 2a with which the fingerprint 11 can be brought into contact, and a lower surface opposite to the contact surface, respectively. Although the transparent board 21 simply has to have an antireflection film 22 on the contact surface 2a with which the fingerprint 11 can be brought into contact, it is more preferable that the transparent board 21 also has an antireflection film 22 on the lower surface opposite to the contact surface 2a. Preferably, the antireflection film 22 has 95% or more of transmittance, and, more preferably, has 99% or more of transmittance.

A light source 3 for applying light that can pass through the fingertip 1 to the fingertip 1 is so disposed that the light travels from a nail side of the fingertip 1 (i.e., a side opposite to the side of the fingerprint 11) to the side of the fingerprint 11. A light emitting device for emitting light whose dominant wavelengths fall within the red or near-infrared region, i.e., projection light of any wavelength in the red or near-infrared region (i.e., monochrome light), projection light that is a mixture of light rays of wavelengths in the red through near-infrared region, or projection light including, as dominant light rays, light of wavelengths in the red or near-infrared region (which can be either monochrome light or a mixture of light rays of wavelengths in the red through near-infrared region) is used as the light source 3. For example, a laser, a light emitting diode, or a lamp light source can be used as the light source 3. Although light of wavelengths in the red or near-infrared region is used preferably because such the light of wavelengths in the red or near-infrared region has high transmittance for the object to be detected 1 which is a tissue from a living body, light of wavelengths in a 600 nm to 1400 nm range is more preferable. Since the optical absorption of the hemoglobin in a blood vessel is minimum at wavelengths of about 660 nm, light whose dominant wavelengths fall within a range of 630 nm to 780 nm is still more preferable in order to reduce the adverse effect of blood vessels on the fingerprint image. The fingertip 1 and the light source 3 can be covered by a shading member so that they are not affected by light from outside the identity verification apparatus.

An image pickup unit 4 (also referred to as an image pickup system 4 from here on) measures a distribution of the intensities of light rays from internal tissues of the fingertip 1 in a plane (this plane is shown by a A-A line of FIG. 1 and is referred to as an observation plane from here on) which is at only a predetermined distance from the fingerprint contact surface 2a of the object-to-be-detected holding member 2 toward an inner side of the fingertip 1, so as to pick up an image of the fingerprint. The image pickup unit 4 is provided with a wavelength selection element 41, which is disposed as a wavelength selection means, an image formation lens 42, which is disposed as an image formation means, an image sensor 43, and an image output circuit 44. A plane mirror 100, which is disposed as a reflective means, is installed so that the light passing through the object-to-be-detected holding member 2 can be deflected at a right angle, and the wavelength selection element 41, the image formation lens 42, and the image sensor 43 are disposed so that those components face the deflected light, that is, they are running along a direction of the optical axis of the deflected light.

The wavelength selection element 41 allows only light of substantially the same wavelengths as that emitted out of the light source 3 (i.e., light of wavelengths in the red or near-infrared region) to pass therethrough, and an interference filter, a filter glass, or a plastic filter can be used as the wavelength selection element 41, for example. The output light from the wavelength selection element 41 is focused, as an image, on the image sensor 43 through the image formation lens 42. The image formation lens 42 is so formed that its focal point is placed at internal tissues of the fingertip 1 which are located in an upward direction of FIG. 1 with respect to the fingerprint contact surface 2a of the object-to-be-detected holding member 2, i.e., the internal tissues of the fingertip 1 which are in the plane (i.e., the observation plane) that is at only a predetermined distance from the fingerprint contact surface 2a toward the inner side of the fingertip 1. More preferably, the focal point of the image formation lens 42 is placed at the internal tissues of the fingertip 1 which are in a plane that is at only a distance ranging from 0.1 mm to 1.0 mm from the fingerprint contact surface 2a toward the inner side of the fingertip 1. It is preferable that the image formation lens 42 has such a small depth of field as 0.5 mm or less. More preferably, the image formation lens 42 has a depth of field of 0.1 mm or less. The image sensor 43 can be a tow-dimensional solid state image pickup device, such as a CCD (charge coupled device) or CMOS (complementary metal oxide semiconductor) image sensor, or an image pickup tube. The image sensor 43 has sensitivity to the light which passes through the fingertip 1 and reaches the observation plane in the internal tissues of the fingertip 1. In other words, the image sensor 43 has sensitivity to light of wavelengths in the red or near-infrared region. The image pickup unit 4 is so light-shielded that it does not receive any light other than the light from the fingertip 1. The image output circuit 44 converts an electric signal from the image sensor 43 into an image electric signal.

In accordance with this embodiment, the light source 3 is so arranged as to apply light to the fingertip (i.e., the object to be detected) 1 held by the object-to-be-detected holding member 2, from the nail side of the fingertip, i.e., from an object side of the object-to-be-detected holding member 2, on which the object is placed, with the fingerprint 11 being in contact with the object-to-be-detected holding member 2, and the image pickup unit 4 is arranged on a side opposite to the object side of the object-to-be-detected holding member 2, on which the object to be detected 1 is placed, so as to measure a distribution of the intensities of light rays from the object to be detected 1 in the plane (i.e., the observation plane) which is at only a predetermined distance from the fingerprint contact surface 2a of the object-to-be-detected holding member 2 toward the inner side of the object to be detected 1.

The signal processing unit 5 verifies an identity based on the fingerprint image outputted from the image output circuit 44 of the image pickup unit 4. The signal processing unit 5 is provided with a brightness determination circuit 51 (corresponding to a brightness determination means). The brightness determination circuit 51 determines whether the brightness of the fingerprint image outputted from the image output circuit 44 of the image pickup unit 4 falls within a threshold range defined in advance, and, based on the determination result, controls a light source driving circuit 6 (corresponding to a light source driving means). In accordance with this embodiment, the lightness determination circuit 51 and the light source driving circuit 6 constitute a means for adjusting the intensity of the light applied to the object to be detected 1 so that the lightness of the fingerprint image outputted from the image pickup unit 4 falls within the threshold range defined in advance.

Next, the operation of the identity verification apparatus in accordance with embodiment 1 of the present invention will be explained. When the fingertip 1 of a person's finger is held by the object-to-be-detected holding member 2 so that the fingerprint 11 of the fingertip 1 is brought into physical contact with the contact surface 2a, the light emitted out of the light source 3 is applied to the nail side (i.e., the side opposite to the fingerprint side of the fingertip 1) of the fingertip 1. The light applied to the fingertip 1 travels within the fingertip 1 and arrives at the target internal tissues of the fingertip 1 in the observation plane. Since the light transmittance of internal tissues of the fingertip 1 at the depressions 12 of the fingerprint 11 is higher than that at the projections 13 of the fingerprint 11 in the observation plane, the intensity of light rays passing through the internal tissues of the fingertip 1 at the depressions 12 of the fingerprint 11 is higher than that at the projections 13 of the fingerprint 11 in the observation plane, and a light intensity distribution depending upon the projection and depression pattern of the fingerprint 11 can be measured.

The image formation lens 42 of the image pickup unit 4 then carries out image formation of the light intensity distribution of light rays passing through the internal tissues of the fingertip 1 in the observation plane to the image sensor 43. An explanation of the operation will be made by taking the direction in which the light travels into consideration. The light passing through the internal tissues of the fingertip 1 in the observation plane, the internal tissues having a light intensity distribution depending upon the projection and depression pattern of the fingerprint 11, then penetrates the object-to-be-detected holding member 2 provided with the transparent board 21 having the antireflection films 22 formed on the contact surface 2a and lower surface thereof. The light which has penetrated the object-to-be-detected holding member 2 is deflected at a right angle by the plane mirror 100 which is disposed in order to achieve the downsizing of the optical system, and only light of substantially the same wavelength as the light emitted out of the light source 3 (i.e., light of wavelengths in the red or near-infrared region) is selected by the wavelength selection element 41. The light signal outputted from the wavelength selection element 41 passes through the image formation lens 42 and an image of the light signal is formed on the image sensor 43. The image output circuit 44 accepts an electric signal from the image sensor 43, and outputs an image electric signal indicating the image of the fingerprint, the troughs of the fingerprint having higher brightness than the crests of the fingerprint.

The fingerprint image thus obtained by the image pickup unit 4 is delivered to the signal processing unit 5. The signal processing unit 5 performs image processing, such as binarization and thinning, on the fingerprint image so as to extract feature information on the fingerprint (i.e., fingerprint information), as disclosed in Japanese patent application publication No. 10-334237. The signal processing unit 5 then performs registration of the fingerprint feature information and compares the new fingerprint feature information with a list of pieces of already-registered fingerprint feature information. Thereby, the identity verification apparatus can identify the user.

In accordance with this embodiment, the signal processing unit 5 is provided with the lightness determination circuit 51 for determining whether the lightness of the fingerprint image is too high or too low before extracting the above-mentioned feature information on the features of the fingerprint. When the lightness of the fingerprint image is insufficient, the lightness determination circuit 51 controls the light source driving circuit 6 so that the lightness of the fingerprint image falls within a predetermined range from a lower threshold to a higher threshold, and the image pickup unit 4 then picks up an image of the fingerprint again. That is, when the lightness of the fingerprint image is lower than the lower threshold defined in advance, the lightness determination circuit 51 sends an electric signal to the light source driving circuit 6 so as to cause the light source 3 to output projection light rays having maximum lightness that does not reach a level of saturation. In contrast, when the lightness of the fingerprint image is higher than the higher threshold defined in advance, the lightness determination circuit 51 causes the light source 3 to output projection light rays having lightness equal to or lower than the higher threshold. Thus, the identity verification apparatus can prevent degradation of the quality of the fingerprint image and reduction in the identity verification performance due to saturation or reduction of the lightness of the fingerprint image by setting the lower and higher thresholds of the lightness of the fingerprint image to proper values.

As mentioned above, according to this embodiment, since the light intensity distribution caused by the light transmittance of the internal tissues having an optical property corresponding to the projection and depression pattern of the fingerprint portion can be detected, the identity verification apparatus and the fingerprint image pickup method can obtain a good-quality fingerprint image that is not affected by the surface state of the fingerprint 11 (for example, the wet condition of the skin surface due to sweat, oil or water, existence of a cut or scratch on the skin surface, wear of the skin surface, etc.). Therefore, the use of the identity verification apparatus and the fingerprint image pickup method according to this embodiment can improve the performance of identity verification.

In accordance with this embodiment, the positioning the focal point of the image formation lens (i.e., the image formation means) at the internal tissues of the object to be detected 1 that are apart from the fingerprint contact surface 2a of the object-to-be-detected holding member 2 makes it possible for the identity verification apparatus to measure a distribution of the intensities of light rays passing through the internal tissues of the object to be detected 1 in the observation plane which is at only the predetermined distance from the fingerprint contact surface 2a of the object-to-be-detected holding member 2 toward the inner side of the object to be detected 1.

In addition, since the identity verification apparatus has the transparent object-to-be-detected holding member 2 that can hold the object to be detected (i.e., the fingertip) 1 with the fingerprint 11 of the object to be detected being in contact with the contact surface thereof, a contact portion of the fingertip 1 that is being in contact with the object-to-be-detected holding member 2 becomes almost flat, the fingertip 1 being held by the object holding member 2 with the fingerprint 11 being in contact with the contact surface, and therefore the focal point of the image formation lens 42 can be accurately and easily positioned at the internal tissues of the object to be detected 1 in the plane (i.e., the observation plane) which is at only the predetermined distance from the fingerprint contact surface 2a of the object-to-be-detected holding member 2 toward the inner side of the object to be detected 1.

When the internal tissues in the vicinity of the skin surface of the fingertip, which have an optical property corresponding to the projection and depression pattern of the fingerprint, are in a range of about 0.1 mm to 1.0 mm from the outer skin of the fingertip (i.e., the skin surface on the side of the fingerprint 11), the focal point of the image formation lens 42 is positioned within this range and the image formation lens 42 is so constructed as to have a depth of field that is 0.5 mm or less, which is equal to or shorter than the distance between the outer skin and the above-mentioned internal tissues part. Preferably, the image formation lens 42 has a depth of field of 0.1 mm or less. The light intensity distribution of the internal tissues of the object to be detected 1 in the plane which is at only the predetermined distance ranging from 0.1 mm to 1.0 mm from the fingerprint contact surface 2a of the object-to-be-detected holding member 2 toward the inner side of the object to be detected 1, i.e., the light having an optical property of the internal tissues that corresponds to the projection and depression pattern of the fingerprint can be detected with a high degree of accuracy and without being affected by the skin surface of the fingerprint.

Since the object-to-be-detected holding member 2 is provided with the antireflection films 22 formed on the contact surface and lower surface thereof, the light passing through the troughs (i.e., the depressions) 12 of the fingerprint 11 can be prevented from being partially reflected by the object-to-be-detected holding member 2. As a result, the light rays passing through the object to be detected (i.e., the fingertip) 1 can be made to reach the image formation lens 42 without disturbing the contrast of the distribution of the intensities of the light rays passing through the object to be detected 1 in the observation plane (i.e., in the plane which is at only the predetermined distance from the fingerprint contact surface 2a of the object-to-be-detected holding member 2 toward the inner side of the object to be detected 1), i.e., without reducing the difference between the amount of light rays passing through a part of the internal tissues having an optical property that corresponds to the troughs of the fingerprint in the observation plane, and the amount of light rays passing through another part of the internal tissues having an optical property that corresponds to the crests of the fingerprint in the observation plane.

In addition, since the blood in blood vessels which are close to the fingerprint 11 of the fingertip 1 can be moved to other parts that are apart from the fingerprint 11 of the fingertip 1 when the fingertip 1 is pushed toward the object-to-be-detected holding member 2, the projection light emitted out of the light source 3 can be mainly absorbed by the blood vessels that are close to the fingerprint 11 of the fingertip 1 before reaching the observation plane, and therefore the adverse effect of the absorption on the light intensity distribution corresponding to the projection and depression pattern of the fingerprint in the observation plane can be prevented.

The above description is directed to the case where the focal point of the image formation lens (i.e., the image formation means) 42 is located in the plane which is at only the predetermined distance, which falls within the range of 0.1 mm to 1.0 mm, from the fingerprint contact surface 2a of the object-to-be-detected holding member 2 toward the inner side of the object to be detected 1, and the image formation lens 42 preferably has a depth of field of 0.5 mm or less. However, as previously mentioned, since the distribution of the intensities of the light rays passing through the internal tissues (which are located inside the fingertip and are at the distance ranging from about 0.1 mm to about 1.0 mm from the fingerprint side surface of the fingertip) which have an optical property corresponding to the projection and depression pattern of the fingerprint represents the projection and depression pattern of the fingerprint, the identity verification apparatus simply has to measure a distribution of the intensities of light rays which have passed through at least a part of the thickness of those internal tissues. Therefore, the focal point of the image formation lens 42 simply has to be positioned in a plane that is placed between the fingerprint contact surface 2a of the object-to-be-detected holding member 2 and the internal tissues having an optical property corresponding to the projection and depression pattern of the fingerprint. In other words, in a case where the internal tissues having an optical property corresponding to the projection and depression pattern of the fingerprint are located at a distance ranging from 0.1 mm to 1.0 mm from the fingerprint, the focal point of the image formation lens 42 simply has to be positioned in a plane which is at only a distance ranging from 0 to 1.0 mm from the fingerprint, i.e., the fingerprint contact surface 2a of the object-to-be-detected holding member 2 toward the inner side of the object to be detected 1. In other words, any plane which is located at the distance from the fingerprint to the internal tissues simply has to be included in the range of the depth of field of the image formation lens 42. Although no mention will be made of the structure in the following embodiments, an identity verification apparatus according to either of the following embodiments also has the same structure.

Actually, experiments using the image formation lens 42 having a depth of field of 100 micrometers were carried out for both a case where the focal point of the image formation lens 42 is positioned in a plane that is at a distance of 0.5 mm from the fingerprint contact surface 2a of the object-to-be-detected holding member 2 toward the inner side of the object to be detected 1, and a case where the focal point of the image formation lens 42 is positioned is located at the fingerprint contact surface 2a of the object-to-be-detected holding member 2, and light rays passing through the projections of the fingerprint and light rays passing through the depressions of the fingerprint were detected by the identity verification apparatus of this embodiment and a fingerprint image having bright portions corresponding to the projections and dark portions corresponding to the depressions was generated for each of the cases. The experimental results showed that there was no difference in contrast between the two cases, and the obtained fingerprint images were clear. Further experiments were carried out by using the image formation lens 42 having a depth of field of 100 micrometers, and by using the image formation lens 42 having a depth of field of 5 mm, for the case where the focal point of the image formation lens 42 is positioned in a plane that is at a distance of 0.5 mm from the fingerprint contact surface 2a of the object-to-be-detected holding member 2 toward the inner side of the object to be detected 1, and light rays passing through the projections of the fingerprint and light rays passing through the depressions of the fingerprint were detected by the identity verification apparatus of this embodiment and a fingerprint image having bright portions corresponding to the projections and dark portions corresponding to the depressions was obtained for each of the cases. The experimental results showed that there was no difference in contrast between the two cases, and the obtained fingerprint images were clear. It is clear from the experimental results that the depth of field of the image formation lens 42 has not so much influence upon the quality of the fingerprint image. Although no mention will be made of this feature in the following embodiments, an identity verification apparatus according to either of the following embodiments also has the same feature.

Figure 20:
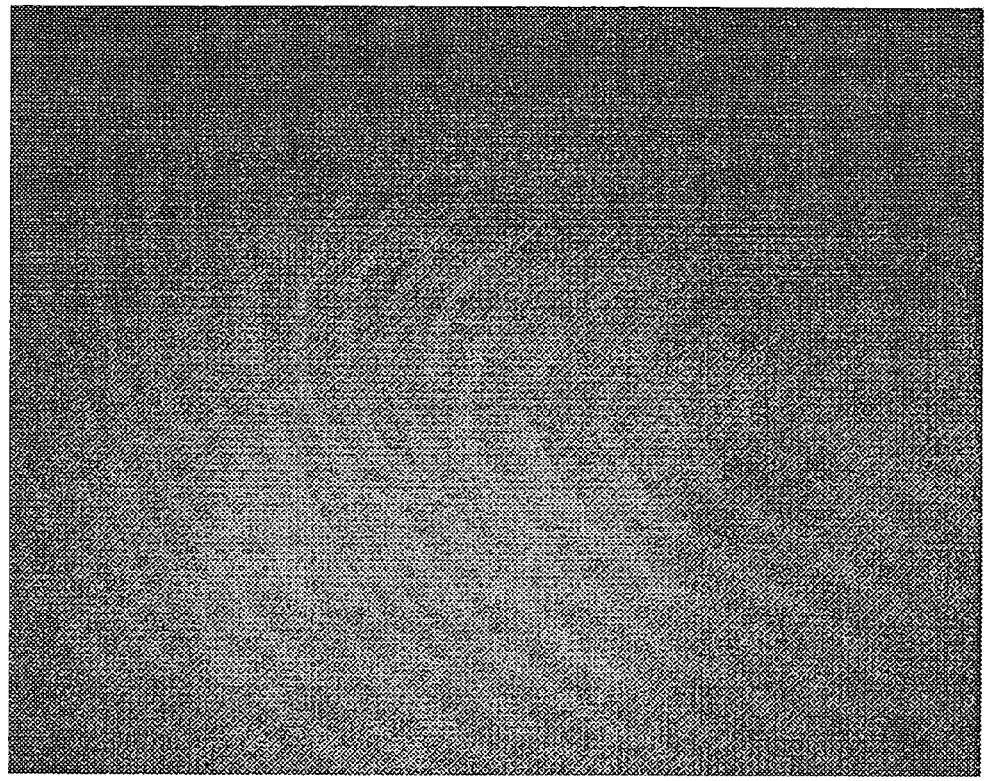
FIG. 20 is a diagram showing a fingerprint image generated by the identity verification apparatus and the fingerprint image pickup method according to embodiment 1 of the present invention.
Figure 21:
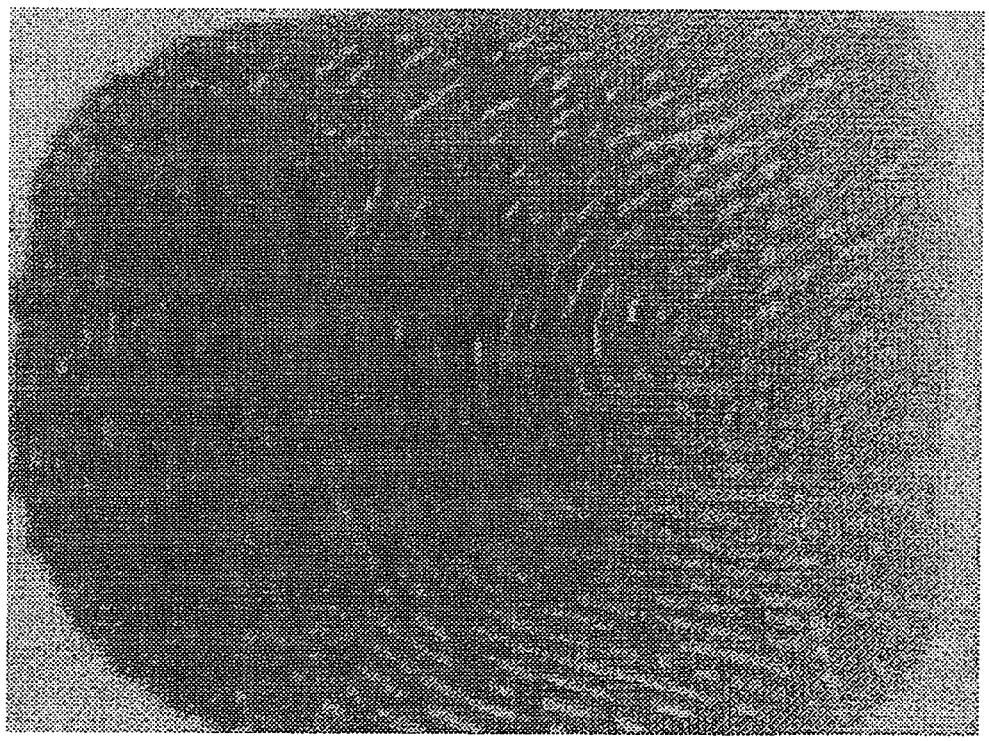
FIG. 21 is a diagram showing a fingerprint image generated by using a prior art technique.

FIG. 20 shows a fingerprint image obtained by using the image formation lens having a depth of field of 5 mm and by using a CCD in a case where silicon oil is applied to the fingerprint that is an object to be measured. In the fingerprint image of FIG. 20, bright portions (i.e., white portions) correspond to the depressions of the fingerprint and dark portions correspond to the projections of the fingerprint. For purposes of comparison with the identity verification apparatus according to this embodiment, FIG. 21 shows a fingerprint image obtained by using a projection and depression pattern detecting device disclosed in Japanese patent application publication No. 2001-153630 when silicon oil is applied to a fingerprint that is an object to be measured, the projection and depression pattern detecting device including a first optical system having a light source, a transparent light guide member having a detection surface on which the object to be detected having a projection and depression pattern is placed, a curved surface for reflecting light scattered from the detection surface, a surface opposite to the curved surface and having an opening via which light reflected from both a light absorption surface and the curved surface is emitted, and an incident surface via which the light from the light source is incident upon the transparent light guide member, and a second optical system for making the outgoing light from the opening be incident upon an image sensor. In the fingerprint image of FIG. 21, bright portions (i.e., white portions) correspond to the projections of the fingerprint and dark portions correspond to the depressions of the fingerprint.

It is clear from the comparison between FIG. 20 and FIG. 21 that when using the identity verification apparatus and the fingerprint image pickup method according to this embodiment as shown in FIG. 20, there is little discontinuous part in the projection and depression pattern of the fingerprint even though silicon oil is applied to the fingerprint, while when using the conventional projection and depression pattern detecting device as shown in FIG. 21, there are many discontinuous parts in the projection and depression pattern of the fingerprint when silicon oil is applied to the fingerprint.

Figure 19:
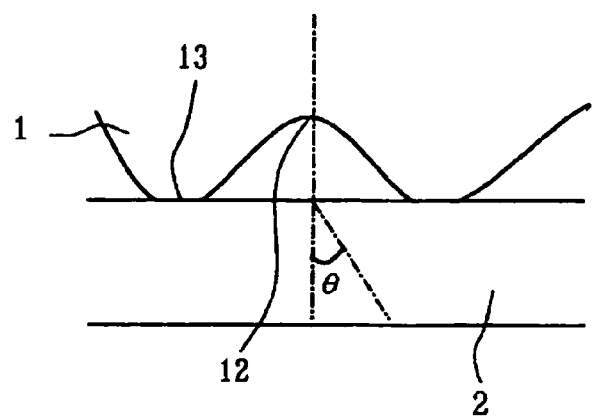
FIG. 19 is a diagram for explaining the identity verification apparatus and the fingerprint image pickup method according to any one of embodiments 1 to 9 of the present invention.

As shown in FIG. 1, the light emitted out of the light source is made to be incident upon the object-to-be-detected holding member 2 for detection of light passing through the object to be detected in such a manner that the light travels in a direction that is substantially perpendicular to a surface of the object-to-be-detected holding member 2 that is in contact with the fingerprint (i.e., the fingerprint contact surface 2a). The traveling direction of the light emitted out of the light source is not limited to the one that is substantially perpendicular to the fingerprint contact surface 2a. As schematically shown in FIG. 19 that is an enlarged view of a contact between the object-to-be-detected holding member 2 and the object to be detected 1, it is simply necessary to detect light that is made to be incident in a direction with a critical angle θ or less of the total reflection at the fingerprint contact surface 2a of the object-to-be-detected holding member 2, the critical angle being decided by both the index of refraction of a gas between the depressions 12 of the fingerprint and the object-to-be-detected holding member 2 and the index of refraction of the object-to-be-detected holding member 2. Although no mention will be made of the configuration in the following embodiments, an identity verification apparatus according to either of the following embodiments also has the same configuration.

Assuming that the gas between the depressions 12 of the fingerprint and the object-to-be-detected holding member 2 is air and the object-to-be-detected holding member 2 is formed of glass, for example, and the index of refraction $n_0$ of the air is 1.0 and the index of refraction $n_g$ of the glass is 1.5, the critical angle θ is given by the following equation: $θ=\arcsin(n_0/n_g)=41$ (degrees), and light passing through the depressions 12 of the fingerprint is incident upon the object-to-be-detected holding member 2 at an angle of 41 or less degrees. On the other hand, assuming that the index of refraction of the human body is 1.45, $\arcsin(1.45/1.5)=75$ (degrees) and the light passing through the depressions 12 of the fingerprint is incident upon the object-to-be-detected holding member 2 at an angle of 75 or less degrees. Therefore, both the light passing through the projections of the fingerprint and the light passing through the depressions of the fingerprint can be detected by detecting the light that is incident upon the object-to-be-detected holding member 2 at an angle of 41 or less degrees.

Figure 2:
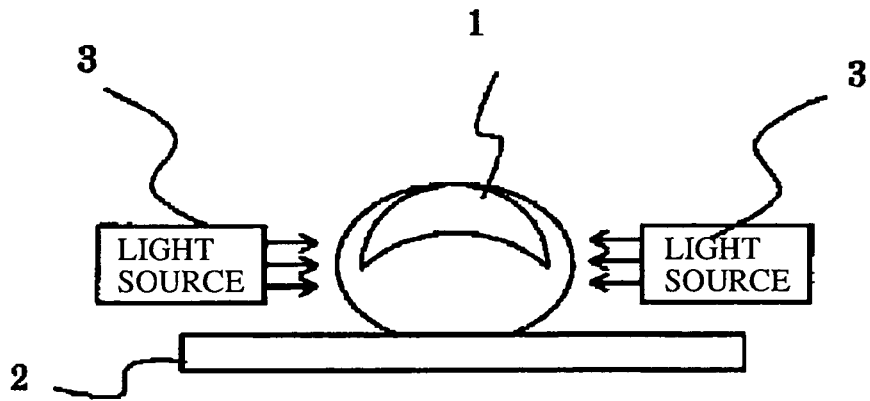
FIG. 2 is a diagram showing the structure of a main part of an identity verification apparatus in accordance with another variant of embodiment 1 of the present invention.
Figure 3:
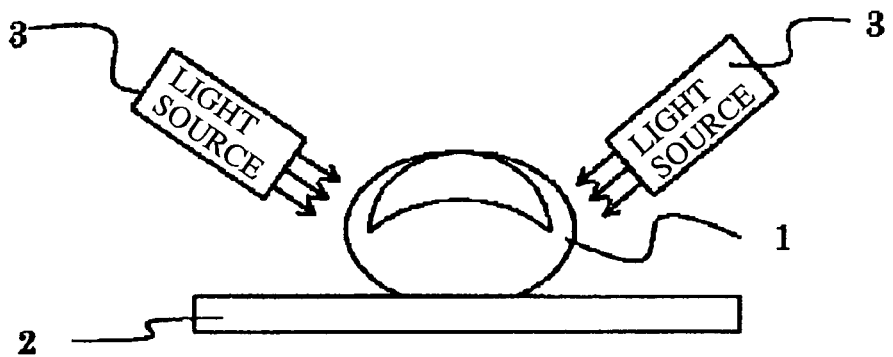
FIG. 3 is a diagram showing the structure of a main part of an identity verification apparatus in accordance with a further variant of embodiment 1 of the present invention.

As shown in FIG. 1, according to this embodiment 1, in order to apply light to the fingertip (i.e., the object to be detected) 1 from a side of the object-to-be-detected holding member 2, on which the object to be detected 1 is placed, with the fingerprint 11 being in contact with the object-to-be-detected holding member 2, the light source 3 is so arranged that the light emitted out of the light source is incident upon at a right angle with respect to the object-to-be-detected holding member 2 from the nail side of the fingertip. As an alternative, two light sources 3 can be so arranged that light rays emitted out of the light sources travel in parallel with the object-to-be-detected holding member 2, as shown in FIG. 2 that is a front view showing the structure of a part of an identity verification apparatus according to a variant of this embodiment 1, which is in the vicinity of the fingertip 1, or two light sources 3 can be so arranged that light rays emitted out of the light sources travel in a slanting direction with respect to the object-to-be-detected holding member 2, as shown in FIG. 3 that is a front view showing the structure of a part of an identity verification apparatus according to another variant of this embodiment 1, which is in the vicinity of the fingertip 1.

Figure 4:
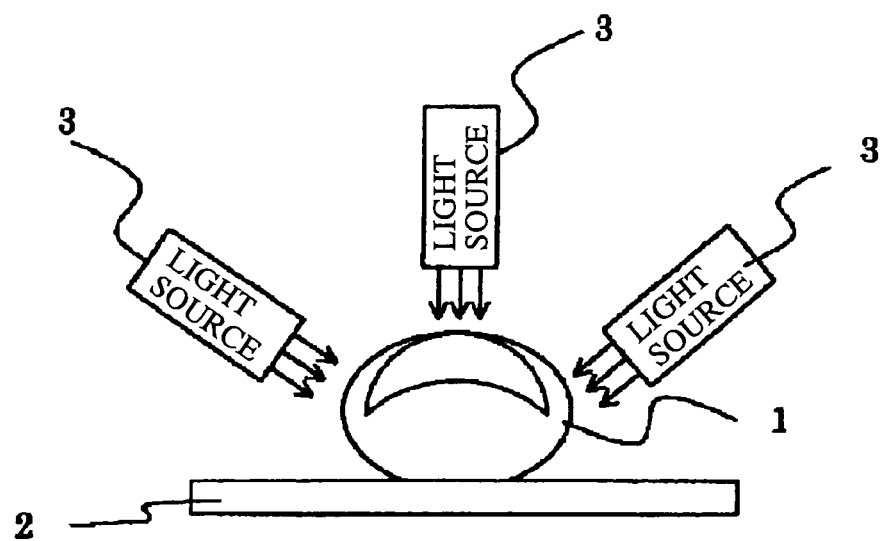
FIG. 4 is a diagram showing the structure of a main part of an identity verification apparatus in accordance with a still further variant of embodiment 1 of the present invention.

As shown in FIG. 4 that is a front view showing the structure of a part of an identity verification apparatus according to a further variant of this embodiment 1, which is in the vicinity of the fingertip 1, three light sources 3 can be so arranged that light rays emitted out of one of the three light sources travel in a direction perpendicular to the object-to-be-detected holding member 2 and light rays emitted out of the two other light sources travel in a slanting direction with respect to the object-to-be-detected holding member 2. Since light can be also applied to the fingertip not only from the nail side of the fingertip 1 but also from the lateral sides of the fingertip 1 according to this configuration, almost the whole of the internal tissues corresponding to the fingerprint on the skin of the fingertip can be irradiated with light and therefore average lightness can be maintained over the whole of the image pickup area.

Figure 5:
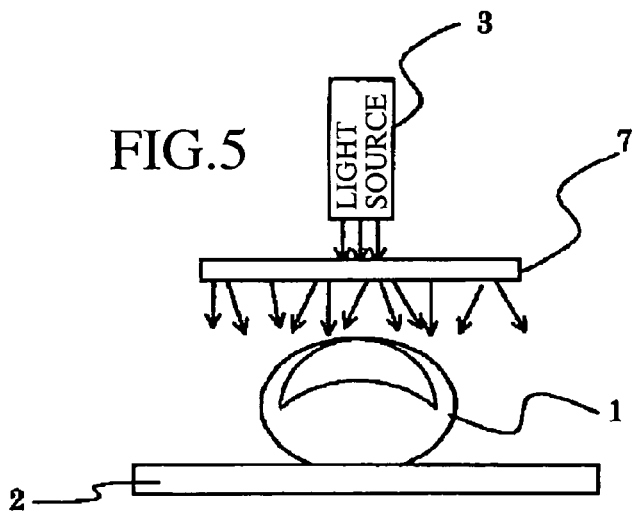
FIG. 5 is a diagram showing the structure of a main part of an identity verification apparatus in accordance with another of embodiment 1 of the present invention.

As shown in FIG. 5, in accordance with a further variant of this embodiment 1, the light source 3 is placed above the nail of the fingertip 1 and a diffuser panel 7 is arranged between the fingertip 1 and the light source 3. Even in this variant, almost the whole of the internal tissues corresponding to the fingerprint on the skin of the fingertip can be irradiated with light and therefore average lightness can be maintained over the whole of the image pickup area.

In accordance with this embodiment 1, the wavelength selection unit 41 is arranged between the plane mirror 100 and the image formation lens 42, as shown in FIG. 1. As an alternative, the wavelength selection unit 41 can be arranged between the image formation lens 42 and the image sensor 43, on the fingerprint contact surface 2a of the object-to-be-detected holding member 2, or between the object-to-be-detected holding member 2 and the plane mirror 100. Alternatively, either the image formation lens or the object-to-be-detected holding member can be so constructed as to have a wavelength selection function. When a cover used for preventing outside light other than the light passing through the fingertip 1 from being incident upon the image pickup unit 4 is disposed, there is no need to provide the wavelength selection unit 41.

In accordance with this embodiment 1, the plane mirror 100 is used as the reflective means, as shown in FIG. 1. The reflective means is not limited to the plane mirror 100, and a curved surface mirror is used instead, for example. In this variant, the distortion and aberration of the fingerprint image can be reduced.

The above-mentioned explanation is made as to the identity verification apparatus for and the fingerprint image pickup method of processing a fingerprint image obtained by the image pickup unit 4 by using the signal processing unit 5, and identifying an individual. It is needless to say that the identity verification apparatus and the fingerprint image pickup method according to embodiment 1 can be also used for simply obtaining a fingerprint image without carrying out identity verification.

Embodiment 2

Figure 6:
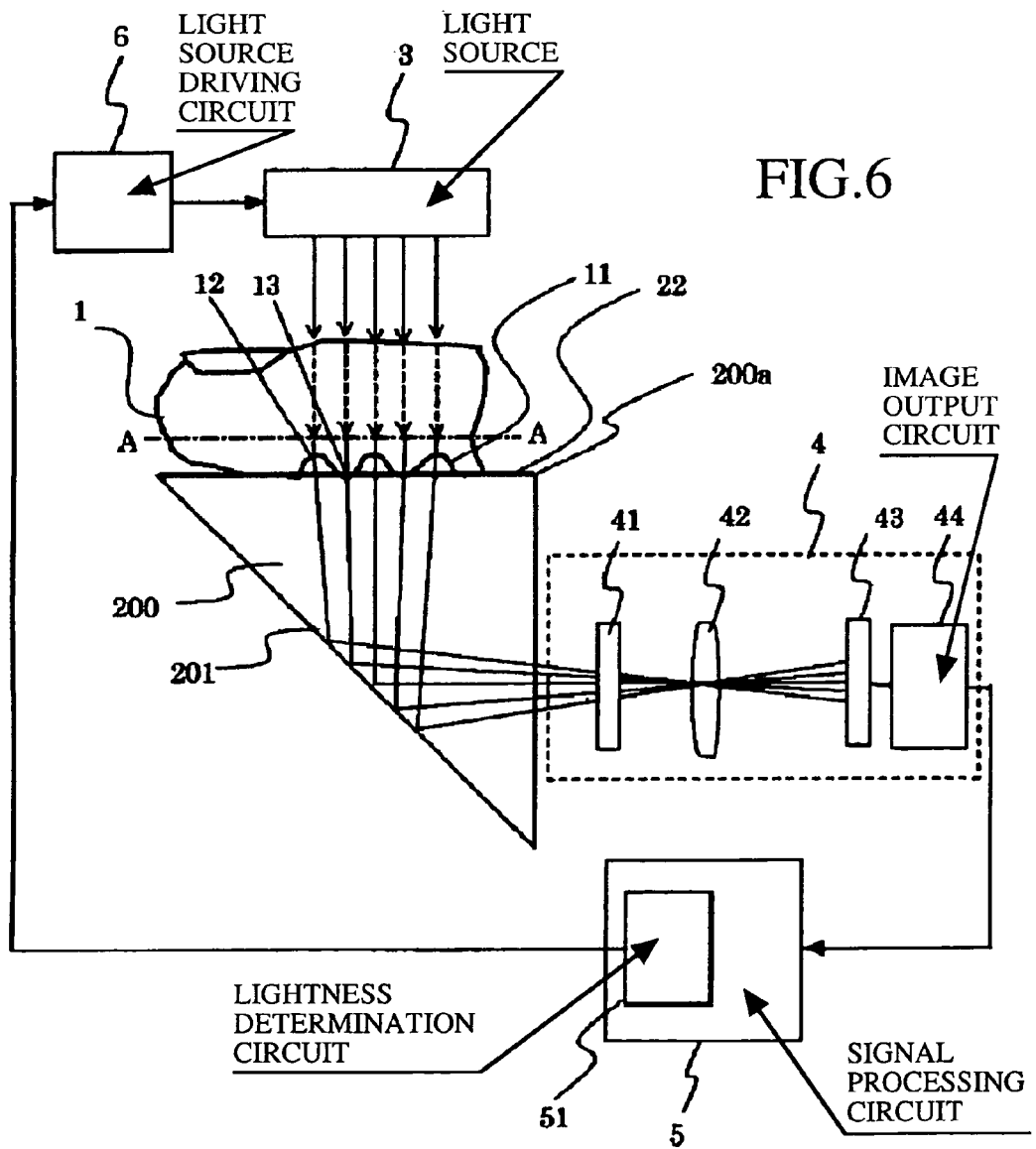
FIG. 6 is a diagram for explaining an identity verification apparatus and a fingerprint image pickup method according to embodiment 2 of the present invention.

FIG. 6 is a diagram for explaining an identity verification apparatus and a fingerprint image pickup method according to embodiment 2 of the present invention, and, more concretely, shows a side view of the structure of the whole of the identity verification apparatus. In accordance with above-mentioned embodiment 1, the object-to-be-detected holding member 2 and the plane mirror 100 as a reflective means are disposed separately, as shown in FIG. 6. In contrast, in accordance with embodiment 2, a transparent rectangular prism 200 is used instead of the object-to-be-detected holding member 2 and the plane mirror 100. The rectangular prism 200 has a fingerprint contact surface 200a that functions in the same way as the fingerprint contact surface 2a of the object-to-bedetected holding member 2 shown in FIG. 1, and a reflective surface 201 that functions in the same way as the plane mirror 100 of FIG. 1. The rectangular prism 200 according to this embodiment has an antireflection film 22 formed on the fingerprint contact surface 200a. The other configuration of the identity verification apparatus is the same as that of the identity verification apparatus according to embodiment 1. This embodiment offers the same advantage as provided by above-mentioned embodiment 1.

A prism in another form can be used instead of the rectangular prism 200. For example, a prism having a curved reflective surface 201 can be used, thereby reducing the distortion and aberration of the fingerprint image.

Embodiment 3

Figure 7:
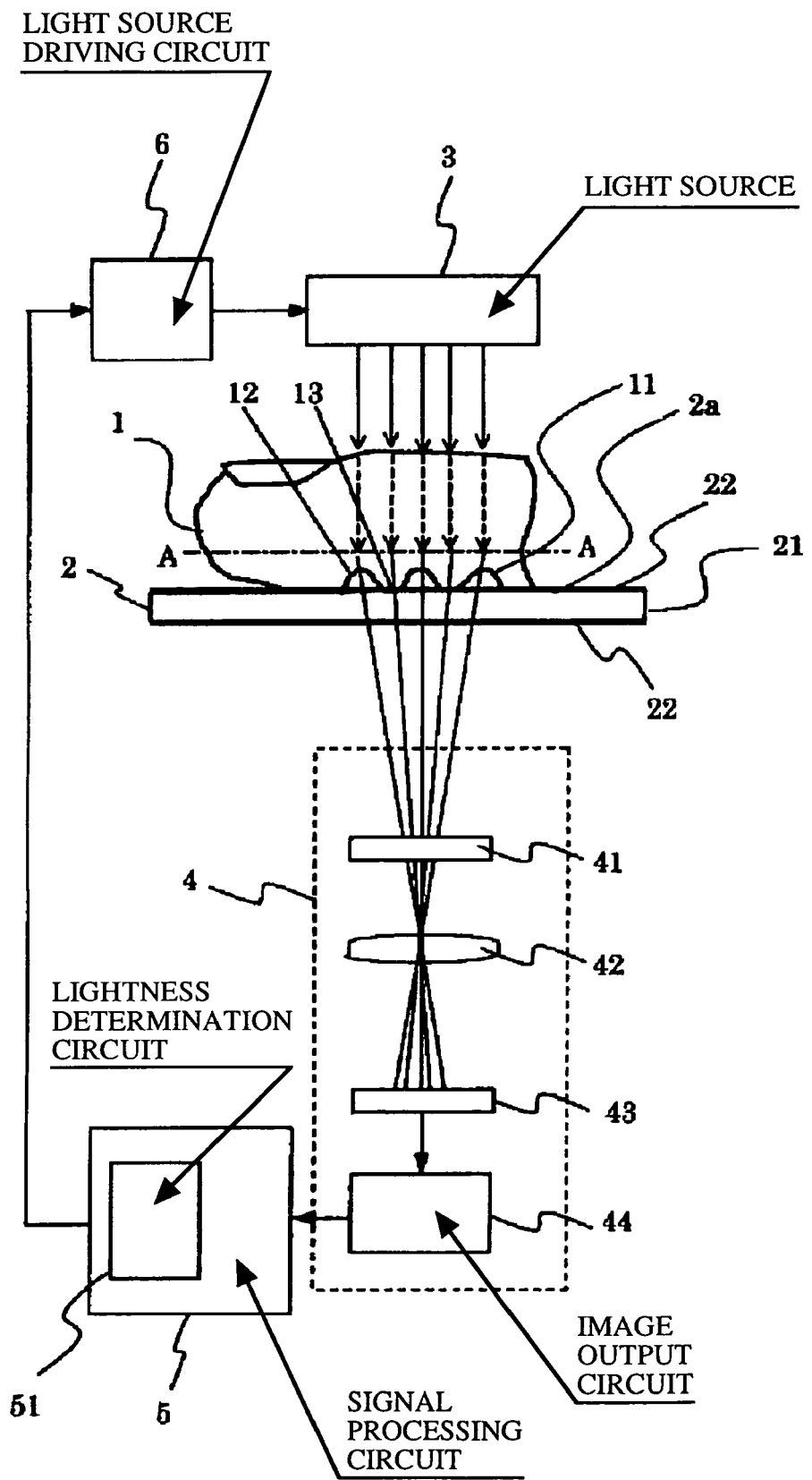
FIG. 7 is a diagram for explaining an identity verification apparatus and a fingerprint image pickup method according to embodiment 3 of the present invention.

FIG. 7 is a diagram for explaining an identity verification apparatus and a fingerprint image pickup method according to embodiment 2 of the present invention, and, more concretely, shows a side view of the structure of the whole of the identity verification apparatus. In accordance with above-mentioned embodiments 1 and 2, the light passing through the object-to-be-detected holding member 2 is deflected by using the plane mirror 100 or the rectangular prism 200. In contrast, in accordance with this embodiment, the light passing through the object-to-be-detected holding member 2 is directly incident upon an image pickup unit 4 without being deflected. This embodiment offers the same advantage as provided by above-mentioned embodiment 1 or 2.

In accordance with each of the above-mentioned embodiments, the identity verification apparatus has the transparent object-to-be-detected holding member 2 (or the rectangular prism 200) that can hold the object to be detected (i.e., the fingertip) 1 with the fingerprint 1 being in contact with the object-to-be-detected holding member 2 in order to make the focal plane of the image formation lens 42 in agreement with the observation plane in the internal tissues of the fingertip 1, as previously mentioned. The object to be detected 1 does not necessarily need to be held with the fingerprint 11 being in contact with the object-to-be-detected holding member 2.

Next, a description will be made as to embodiments in which a distribution of the intensities of light rays passing through internal tissues of the object to be detected in a plane which is at only a predetermined distance from the fingerprint side surface of the object to be detected 1 without holding the object to be detected 1 with the fingerprint 11 being in contact with the object-to-be-detected holding member.

Embodiment 4

Figure 8:
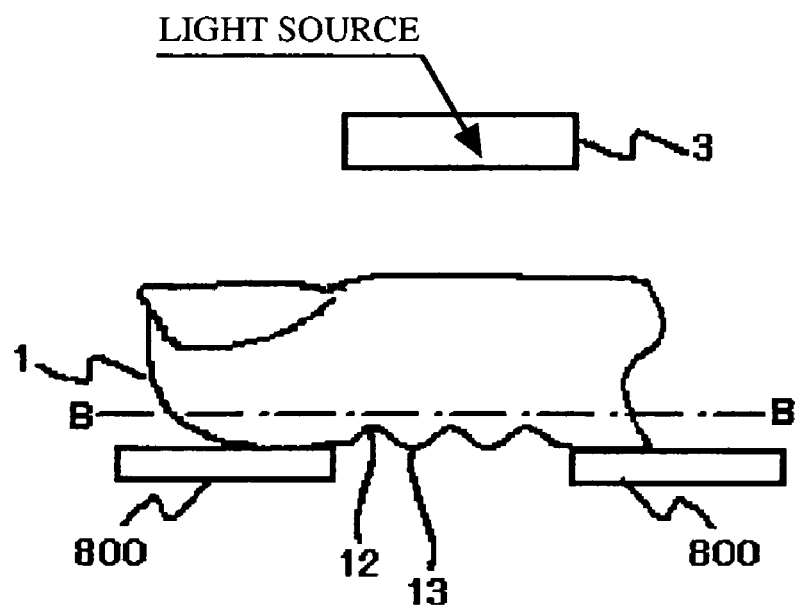
FIG. 8 is a diagram for explaining an identity verification apparatus and a fingerprint image pickup method according to embodiment 4 of the present invention.
Figure 9:
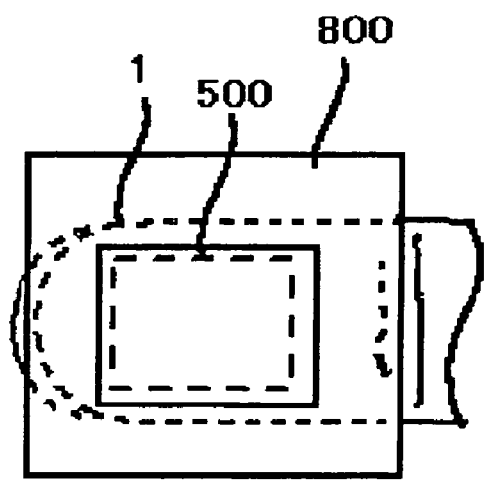
FIG. 9 is a diagram for explaining the identity verification apparatus and the fingerprint image pickup method according to embodiment 4 of the present invention.

FIGS. 8 and 9 are diagrams for explaining an identity verification apparatus and a fingerprint image pickup method according to embodiment 4 of the present invention. More concretely, FIG. 8 shows a side view showing the structure of a part of the identity verification apparatus which is close to a fingertip to be detected, and FIG. 9 shows a top plan view showing the part of the identity verification apparatus which is close to the fingertip to be detected when viewed from an image pickup system. The other configuration of the identity verification apparatus is the same as that of above-mentioned embodiment 1 or 3. A difference between embodiment 1 and this embodiment 4 will be explained hereafter.

In accordance with this embodiment, a part of the object to be detected (i.e., the fingertip) 1 that excludes an image pickup region 500, i.e., that is placed outside the image pickup region 500 can be held by an object-to-be-detected holding member 800 with an opening. That is, the object-to-be-detected holding member 800 holds the object to be detected (i.e., the fingertip) 1 with a fingerprint side surface in the image pickup region 500 (i.e., a fingerprint side surface to be measured) being in noncontact with the object-to-be-detected holding member 800. The object-to-be-detected holding member 800 with an opening is so arranged that the focal plane (shown by a B-B line of FIG. 8.) of an image formation lens 42 is in agreement with an observation plane (i.e., a plane which at only a predetermined distance from the fingerprint side surface) of the fingertip 1, while holding the fingertip 1 without being in contact with the image pickup region 500 of the fingertip 1. As the object-to-be-detected holding member 800 with an opening, as shown in FIGS. 8 and 9, a plate having a larger opening than the image pickup range 500 or at least a pair of rods that are arranged outside the image pickup region 500 so that they are opposite to each other with the image pickup region 500 being sandwiched by the pair of rods can be used, for example.

Thus, according to this configuration, the focal point (i.e., the focal plane) of the image formation lens 42 can be accurately and easily positioned at the internal tissues of the fingertip 1 in the plane (i.e., the observation plane) which is at only the predetermined distance from the fingerprint side surface with the fingerprint in the image pickup range 500 of the fingertip 1 being in noncontact with the object-to-be-detected holding member 800 with an opening. Thus, according to this embodiment, since the light intensity distribution caused by the light transmittance of the internal tissues having an optical property corresponding to the projection and depression pattern of the fingerprint portion can be detected, the identity verification apparatus and the fingerprint image pickup method can obtain a good-quality fingerprint image that is not affected by the surface state of the fingerprint (for example, the wet condition of the skin surface due to sweat, oil or water, existence of a cut or scratch on the skin surface, wear of the skin surface, etc.). Therefore, the use of the identity verification apparatus and the fingerprint image pickup method according to this embodiment can improve the performance of identity verification.

As previously explained in embodiment 1, even in this embodiment, any plane which is located at the distance from the fingerprint to the internal tissues simply has to be included in the range of the depth of field of the image formation lens 42. The image formation lens 42 can cover the curve of the finger as long as it has a large depth of field. As in the case of above-mentioned embodiment 1, the depth of field of the image formation lens 42 has not so much influence upon the clarity of the fingerprint image. Although no mention will be made of the configuration in the following embodiments, an identity verification apparatus according to either of the following embodiments also has the same configuration.

Since near-infrared light has low transmittance with respect to the blood of the human body, a pattern of blood vessels within the fingertip 1 is superimposed on the projection and depression pattern of the fingerprint image outputted from the image pickup unit 4. The pattern of blood vessels can be removed from the fingerprint image outputted from the image pickup unit 4 as follows. First, the fingerprint image outputted from the image pickup unit 4 is used as an original image, and smoothing processing is performed on the original image so as to produce a smoothed image. Since the projection and depression pattern of the fingerprint has a thinner width than the blood vessel pattern, the projection and depression pattern of the fingerprint is removed from the smoothed image and the blood vessel pattern remains in the smoothed image. When a difference operation is then performed on the original image and the smoothed image, the fingerprint image in which only the projection and depression pattern of the fingerprint remains can be obtained and feature information on the feature of the fingerprint is extracted from the fingerprint image. The same processing is carried out by an identity verification apparatus according to either of the following embodiments.

In accordance with each of above-mentioned embodiments 1 to 3, since the blood in blood vessels which are close to the fingerprint 11 of the fingertip 1 can be moved to other parts that are apart from the fingerprint 11 of the fingertip 1 when the fingertip 1 is pushed toward an inner side of the object-to-be-detected holding member 2, the above-mentioned adverse effect of the absorption by the blood can be prevented.

Embodiment 5

Figure 10:
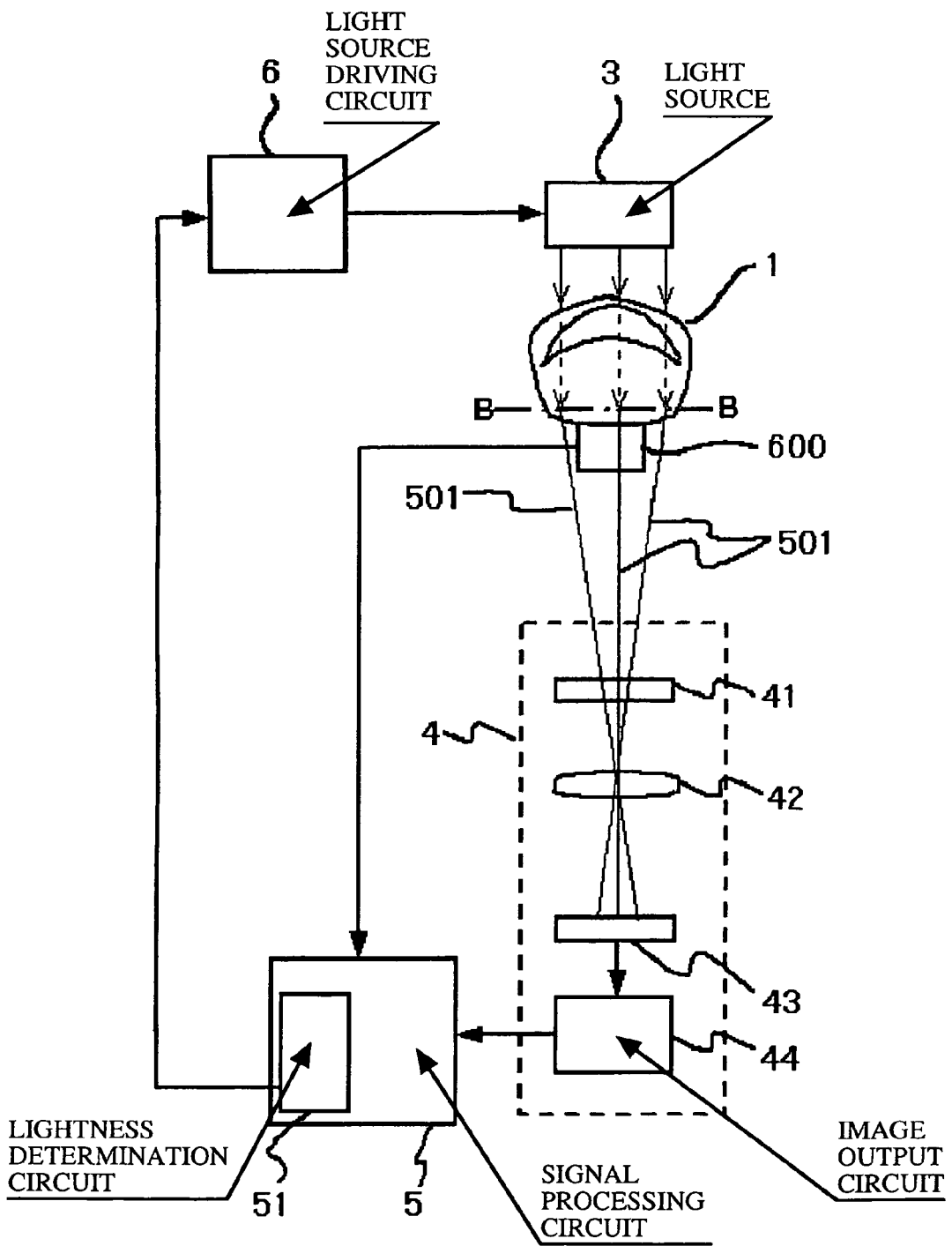
FIG. 10 is a diagram for explaining an identity verification apparatus and a fingerprint image pickup method according to embodiment 5 of the present invention.
Figure 11:
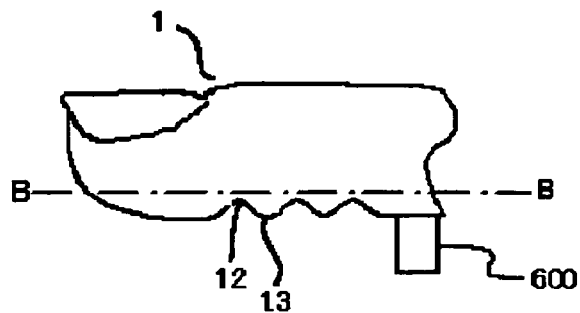
FIG. 11 is a diagram for explaining the identity verification apparatus and the fingerprint image pickup method according to embodiment 5 of the present invention.
Figure 12:
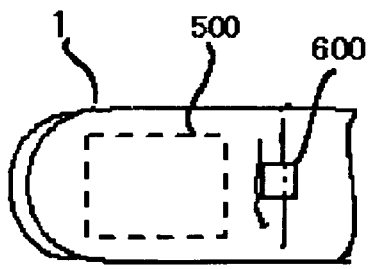
FIG. 12 is a diagram for explaining the identity verification apparatus and the fingerprint image pickup method according to embodiment 5 of the present invention.

FIGS. 10 to 12 are diagrams for explaining an identity verification apparatus and a fingerprint image pickup method according to embodiment 5 of the present invention. More concretely, FIG. 10 shows a front view of the structure of the whole of the identity verification apparatus, FIG. 11 shows a side view showing the structure of a part of the identity verification apparatus which is close to a fingertip to be detected, and FIG. 12 shows a top plan view of the part of the identity verification apparatus which is close to the fingertip to be detected when viewed from an image pickup system. As shown in FIG. 10, the identity verification apparatus according to this embodiment 5 is so constructed as not to deflect light from an observation plane within the object to be detected, like that of above-mentioned embodiment 3. As an alternative, the identity verification apparatus according to this embodiment can be so constructed as to deflect the light from the observation plane by using a plane mirror 100, like that of above-mentioned embodiment 1. A difference between embodiment 1 and this embodiment 5 will be explained hereafter.

In accordance with this embodiment, the focal plane (shown by a B-B line of FIGS. 10 and 11) of an image formation lens 42 is made to be in agreement with the observation plane within the object to be detected (i.e., the fingertip) 1 by using a switch 600. The switch 600 is disposed outside and in the vicinity of an image pickup region 500 so that the focal plane of the image formation lens 42 is made to be in agreement with the observation plane within the fingertip 1 when the finger is brought into contact with the switch 600. Light rays 501 are a principal ray of light rays passing through the image pickup region 500 in the focal plane of the image formation lens 42 and are restricted by the image pickup system 4.

Next, the operation of the identity verification apparatus in accordance with embodiment 5 of the present invention will be explained. When a part of the fingertip 1 adjacent to the image pickup region 500 is brought into contact with the switch 600, the focal plane of the image formation lens 42 is made to be in agreement with the observation plane of the fingertip 1. At this time, the switch 600 sends a signal to a signal processing unit 5. In response to the signal from the switch 600, the signal processing unit 5 carries out identity verification using the fingerprint image from the image output circuit 44, like that of above-mentioned embodiment 1.

Thus, in accordance with this embodiment, the identity verification apparatus detects the position of the fingerprint by using the switch 600 without being in contact with the fingerprint side surface of the object to be detected 1 (i.e., a fingerprint within the image pickup region 500 of the fingertip 1). In other words, the identity verification apparatus detects the position of the fingerprint side surface of the object to be detected 1 that is at only a predetermined distance from the focal point (i.e., the focal plane) of the image formation lens 42 toward the image formation lens 42 without being in contact with the fingerprint side surface of the object to be detected 1. Therefore, the focal point (i.e., the focal plane) of the image formation lens 42 can be accurately and easily positioned at the internal tissues of the fingertip 1 in the plane (i.e., the observation plane) which is at only the predetermined distance from the fingerprint with the fingerprint of the object to be detected 1 (i.e., a fingerprint within the image pickup region 500 of the fingertip 1) being in noncontact with the object-to-be-detected holding member 2.

As mentioned above, according to this embodiment, instead of detecting a distribution of the intensities of light rays passing through the inside of the object to be detected 1 and the fingerprint, the identity verification apparatus detects a distribution of the intensities of light rays passing through a part of internal tissues having an optical property corresponding to the projection and depression pattern of the fingerprint before passing through the fingerprint. Thus, according to this embodiment, the identity verification apparatus and the fingerprint image pickup method can obtain a good-quality fingerprint image that is not affected by the surface state of the fingerprint 11 (for example, the wet condition of the skin surface due to sweat, oil or water, existence of a cut or scratch on the skin surface, wear of the skin surface, etc.). Therefore, the use of the identity verification apparatus and the fingerprint image pickup method according to this embodiment can improve the performance of identity verification.

As previously mentioned, in accordance with each of the above-mentioned embodiments, the object to be detected (fingertip) 1 is brought into contact with the object-to-be-detected holding member 2 (or the rectangular prism 200), the object-to-be-detected holding member 800 with an opening, or the switch 600 in order to make the focal plane of the image formation lens 42 in agreement with the observation plane within internal tissues of the fingertip 1.

Next, a description will be made as to embodiments in which a distribution of the intensities of light rays passing through internal tissues of the object to be detected 1 that are placed in a plane which is at only a predetermined distance from the fingerprint side surface of the object to be detected 1 is measured with the object to be detected 1 being in noncontact with anything.

Embodiment 6

Figure 13:
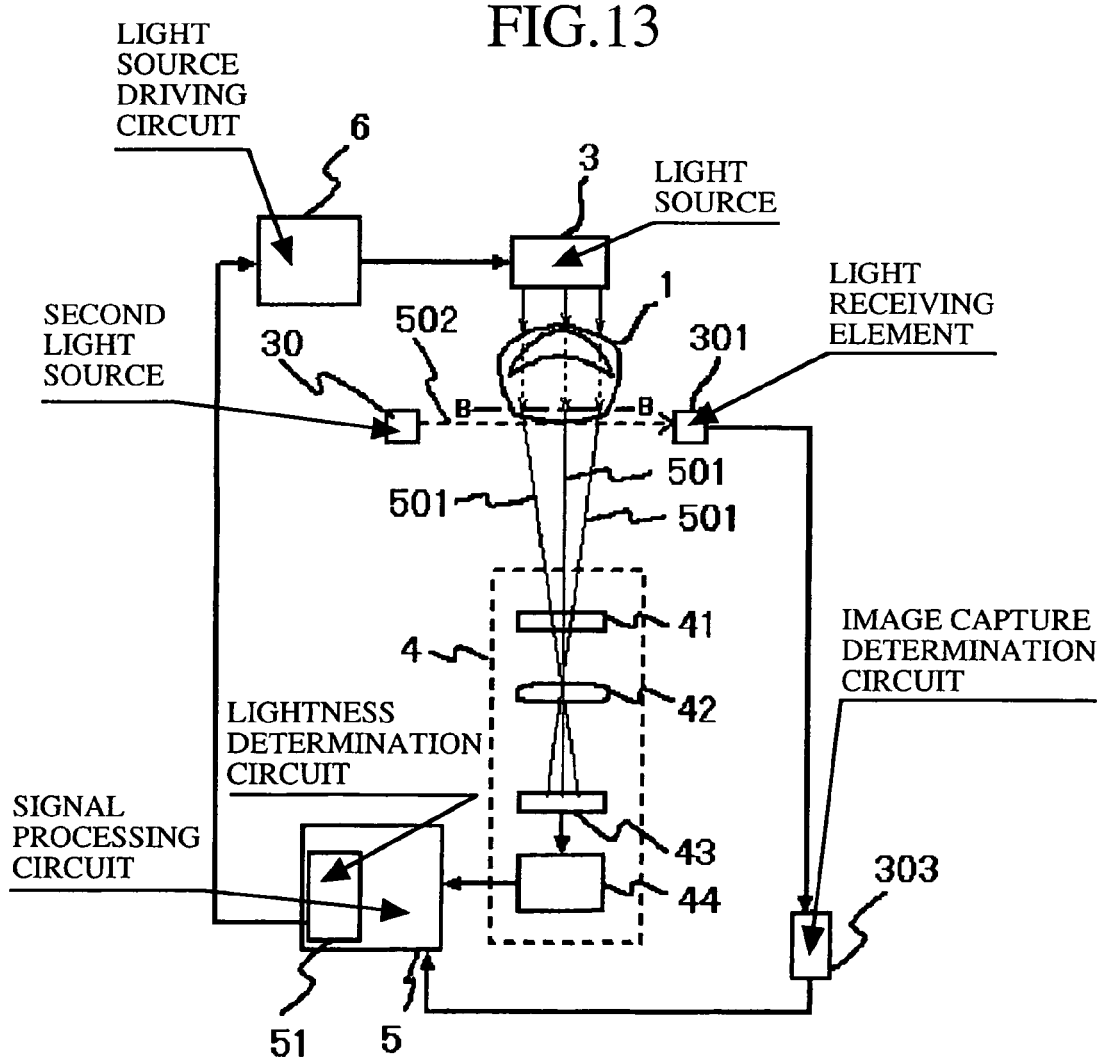
FIG. 13 is a diagram for explaining an identity verification apparatus and a fingerprint image pickup method according to embodiment 6 of the present invention.
Figure 14:
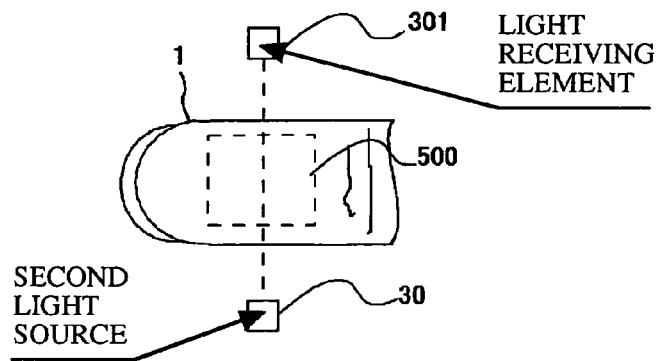
FIG. 14 is a diagram for explaining the identity verification apparatus and the fingerprint image pickup method according to embodiment 6 of the present invention.

FIGS. 13 and 14 are diagrams for explaining an identity verification apparatus and a fingerprint image pickup method according to embodiment 6 of the present invention. More concretely, FIG. 13 shows a front view of the structure of the whole of the identity verification apparatus, and FIG. 14 shows a top plan view of a part of the identity verification apparatus, as shown in FIG. 13, which is close to a fingertip to be detected when viewed from an image pickup system. As shown in FIG. 13, the identity verification apparatus according to this embodiment 6 is so constructed as not to deflect light from an observation plane within the object to be detected, like that of above-mentioned embodiment 3. As an alternative, the identity verification apparatus according to this embodiment can be so constructed as to deflect the light from the observation plane by using a plane mirror 100, like that of above-mentioned embodiment 1. A difference between embodiment 1 and this embodiment 6 will be explained hereafter.

In this embodiment, a second light source 30 that consists of an LED i.e. a light emitting diode or the like and a light receiving unit 30 consisting of a PD (i.e., a photo diode) or the like provided instead of the object-to-be-detected holding member 2 (or the rectangular prism 200), the object-to-be-detected holding member 800 with an opening, and the switch 600, which are explained in above-mentioned embodiments 1 to 5.

The light receiving unit 301 and the second light source 30 are arranged so that an optical path 502 formed by both the second light source 30 and the light receiving unit 301 is parallel to the focal plane (shown by a B-B line of FIG. 13) of an image formation lens 42 and exists in a plane that is at only a distance ranging from 0.1 mm to 1.0 mm from the focal plane of the image formation lens 42 toward the image formation lens 42, and further intersects light rays 501 passing through an image pickup region 500. That is, when the fingerprint of the fingertip 1 is brought into contact with the optical path 502, the focal plane of the image formation lens 42 is made to be in agreement with the observation plane within the object to be detected (i.e., the fingertip) 1. An image capture determination circuit 303 is connected between the light receiving unit 301 and the signal processing unit 5.

Next, the operation of the identity verification apparatus in accordance with embodiment 6 of the present invention will be explained. In the case where the object to be detected (i.e., the fingertip) 1 is placed as shown in FIGS. 13 and 14, when the fingerprint of the fingertip 1 is brought into contact with the optical path 502, the quantity of light detected by the light receiving unit 301 decreases. This means that the focal plane of the image formation lens 42 is made to be in agreement with the observation plane within the object to be detected (i.e., the fingertip) 1. The image capture determination circuit 303 has predetermined upper and lower thresholds, and determines whether an output signal from the light receiving unit 301 has a level that falls within a range from the lower threshold to the upper threshold so as to determine whether or not the focal plane of the image formation lens 42 is in agreement with the observation plane within the object to be detected.

Concretely, the identity verification apparatus turns on the second light source 30 first, and, when the object to be detected (i.e., the fingertip) 1 placed in a state in which the fingerprint thereof does not interrupt the optical path 501 is moved in a downward direction from the light source 3 and toward the optical path 502, the image capture determination circuit 303 determines whether the output signal from the light receiving unit 301 has a level that falls within the range from the lower threshold to the upper threshold at predetermined intervals while the fingertip 1 is moved toward the optical path 502. When the fingerprint of the fingertip 1 is brought into contact with the optical path 502 and the image capture determination circuit 303 determines whether the output signal from the light receiving unit 301 has a level that falls within the range from the lower threshold to the upper threshold, the image capture determination circuit 303 sends a signal to the signal processing unit 5. The signal processing unit 5 carries out identity verification by using a fingerprint image from an image output circuit 44, like that of above-mentioned embodiment 1.

Thus, in accordance with this embodiment, the identity verification apparatus detects the position of the fingerprint side surface by receiving light from the second light source 30 using the light receiving unit 301, and by determining whether the output signal from the light receiving unit 301 has a level that falls within the range from the lower threshold to the upper threshold using the image capture determination circuit 303, without being in contact with the fingerprint side surface of the object to be detected 1. In other words, the identity verification apparatus detects the position of the fingerprint side surface of the object to be detected 1 that is at only a predetermined distance from the focal point (i.e., the focal plane) of the image formation lens 42 toward the image formation lens 42 without being in contact with the fingerprint side surface of the object to be detected 1. Therefore, the focal point (i.e., the focal plane) of the image formation lens 42 can be accurately and easily positioned at the internal tissues of the fingertip 1 in the plane (i.e., the observation plane) which is at only the predetermined distance from the fingerprint side surface with the object to be detected 1 being in noncontact with anything.

As mentioned above, according to this embodiment, instead of detecting a distribution of the intensities of light rays passing through the inside of the object to be detected 1 and the fingerprint, the identity verification apparatus detects a distribution of the intensities of light rays passing through a part of internal tissues having an optical property corresponding to the projection and depression pattern of the fingerprint before passing through the fingerprint. Thus, according to this embodiment, the identity verification apparatus and the fingerprint image pickup method can obtain a good-quality fingerprint image that is not affected by the surface state of the fingerprint (for example, the wet condition of the skin surface due to sweat, oil or water, existence of a cut or scratch on the skin surface, wear of the skin surface, etc.). Therefore, the use of the identity verification apparatus and the fingerprint image pickup method according to this embodiment can improve the performance of identity verification. Since the identity verification apparatus according to this embodiment can detect the position of the fingerprint without being in contact the fingerprint side surface of the object to be detected 1, it is superior to those of above-mentioned embodiments 1 to 5 from the viewpoint of sanitation.

Embodiment 7

Figure 15:
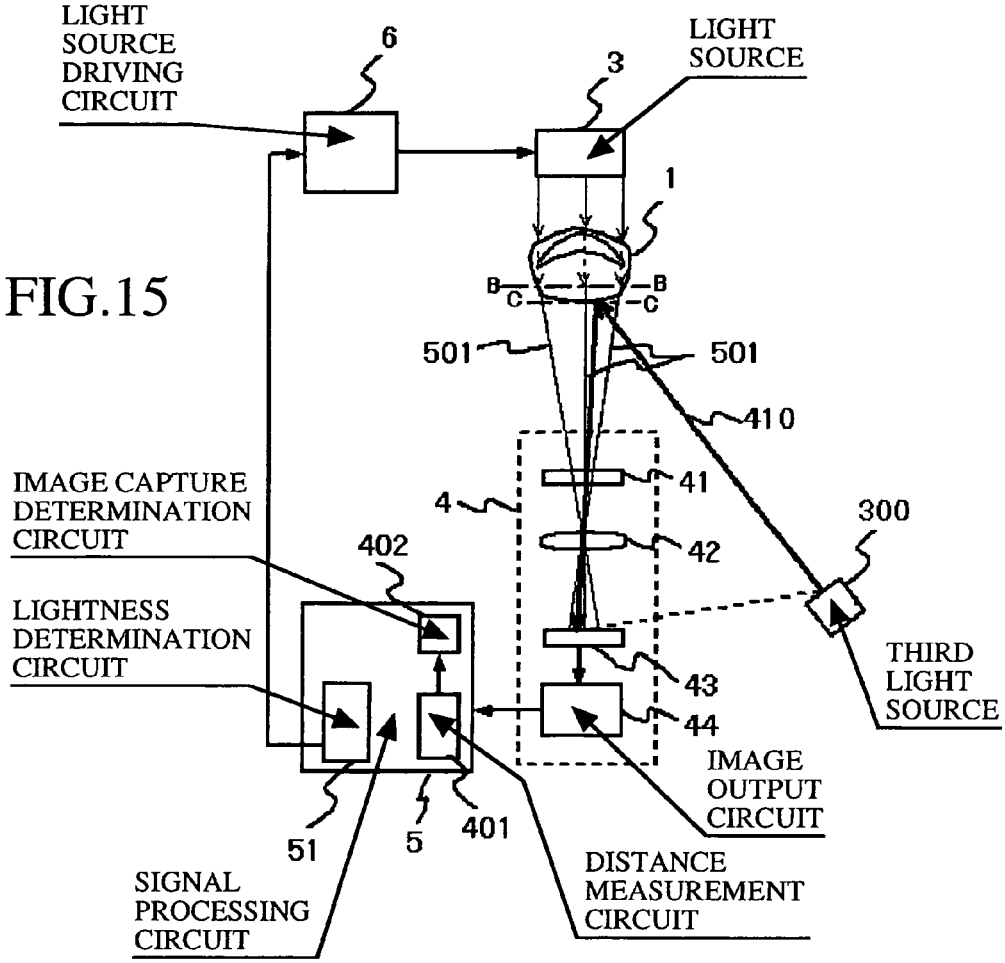
FIG. 15 is a diagram for explaining an identity verification apparatus and a fingerprint image pickup method according to embodiment 7 of the present invention.
Figure 16:
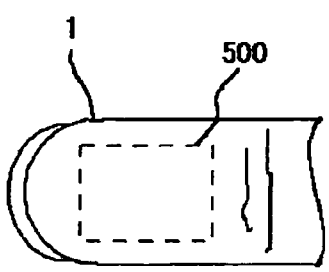
FIG. 16 is a diagram for explaining the identity verification apparatus and the fingerprint image pickup method according to embodiment 7 of the present invention.

FIGS. 15 and 16 are diagrams for explaining an identity verification apparatus and a fingerprint image pickup method according to embodiment 6 of the present invention. More concretely, FIG. 15 shows a front view of the structure of the whole of the identity verification apparatus, and FIG. 16 shows a top plan view of a part of the identity verification apparatus, as shown in FIG. 15, which is close to a fingertip to be detected when viewed from an image pickup system. As shown in FIG. 15, the identity verification apparatus according to this embodiment 7 is so constructed as not to deflect light from an observation plane within the object to be detected, like that of above-mentioned embodiment 3. As an alternative, the identity verification apparatus according to this embodiment can be so constructed as to deflect the light from the observation plane by using a plane mirror 100, like that of above-mentioned embodiment 1. A difference between embodiment 1 and this embodiment 7 will be explained hereafter.

In accordance with this embodiment, the identity verification apparatus applies a light ray from a third light source 300 to a fingerprint side of the fingertip 1, captures light reflected from the fingertip 1 using an image sensor 43, and measures a distance between the fingerprint of the fingertip 1 and an image formation lens 42. The third light source 300 is comprised of such a light emitting element as a light emitting diode or a semiconductor laser, and a lens, and emits a light ray in the form of a beam. The third light source 300 is so disposed that outgoing light 410 emitted therefrom reaches a region in a plane (shown by a C-C line of FIG. 15) that is parallel to the focal plane (shown by a B-B line of FIG. 15) of the image formation lens 42 and that is at only a distance ranging from 0.1 mm to 1.0 mm from the focal plane of the image formation lens 42 toward the image formation lens 42, light rays 501 passing through the fingertip and further passing through the above-mentioned region.

The signal processing unit 5 is provided with a distance measurement circuit 401 for receiving an output signal from an image output circuit 44 and for measuring a distance between the fingerprint side surface of the fingertip 1 and the image sensor 43, and an image capture determination circuit 402 for receiving an output signal from the distance measurement circuit 401 and for determining whether the output signal indicating the measured distance has a level ranging from a lower threshold to an upper threshold, the lower and upper thresholds being determined in advance.

Next, the operation of the identity verification apparatus in accordance with embodiment 7 of the present invention will be explained. The third light source 300 applies a light ray to the fingerprint side of the fingertip 1. While the fingertip 1 is moved toward or away from the image sensor 43 almost along with the optical axis of the image formation lens, the image sensor 43 picks up an image of the fingerprint by capturing light reflected from the fingertip 1 at predetermined intervals. The picked-up image is outputted to the signal processing unit 5 through the image output circuit 44. The signal processing unit 5 determines a position on the image sensor 43 upon which the reflected light is incident by carrying out image processing, and the distance measurement circuit 401 determines the distance between the fingerprint side surface of the fingertip 1 and the image sensor 43 by using a technique of triangulation, and outputs it to the image capture determination circuit 402. The image capture circuit 402 outputs a signal to the signal processing unit 5 when the distance determined by the distance measurement circuit 401 is longer than the distance between the focal plane of the image formation lens 42 and the image sensor 43 by only 0.1 mm to 1.0 mm (i.e., when the focal plane of the image formation lens 42 is in agreement with the observation plane within the fingertip 1). The signal processing unit 5 carries out identity verification by using the fingerprint image from the image output circuit 44, like that of above-mentioned embodiment 1.

Thus, according to this embodiment, the identity verification apparatus applies outgoing light 410 from the third light source 300 to the fingerprint side of the fingertip 1, detects light reflected from the fingerprint side surface of the fingertip 1 by using the image sensor 43, and determines the distance between the fingerprint side surface of the fingertip 1 and the image sensor 43 from a location on the image sensor 43 upon which the reflected light is incident by using a technique of triangulation, so as to detect the position of the fingerprint side surface of the object to be detected 1 without being contact with the fingerprint side surface of the object to be detected 1. Therefore, the focal point (i.e., the focal plane) of the image formation lens 42 can be accurately and easily positioned at the internal tissues of the fingertip 1 in the plane (i.e., the observation plane) which is at only the predetermined distance from the fingerprint side surface of the fingertip with the fingerprint of the object to be detected 1 being in noncontact with the object-to-be-detected holding member 2.

As mentioned above, according to this embodiment, instead of detecting a distribution of the intensities of light rays passing through the inside of the object to be detected 1 and the fingerprint, the identity verification apparatus detects a distribution of the intensities of light rays passing through internal tissues having an optical property corresponding to the projection and depression pattern of the fingerprint before passing through the fingerprint. Thus, according to this embodiment, the identity verification apparatus and the fingerprint image pickup method can obtain a good-quality fingerprint image that is not affected by the surface state of the fingerprint (for example, the wet condition of the skin surface due to sweat, oil or water, existence of a cut or scratch on the skin surface, wear of the skin surface, etc.). Therefore, the use of the identity verification apparatus and the fingerprint image pickup method according to this embodiment can improve the performance of identity verification. Since the identity verification apparatus according to this embodiment can detect the position of the fingerprint without being in contact the fingerprint side surface of the object to be detected 1, it is superior to those of above-mentioned embodiments 1 to 5 from the viewpoint of sanitation.

Embodiment 8

Figure 17:
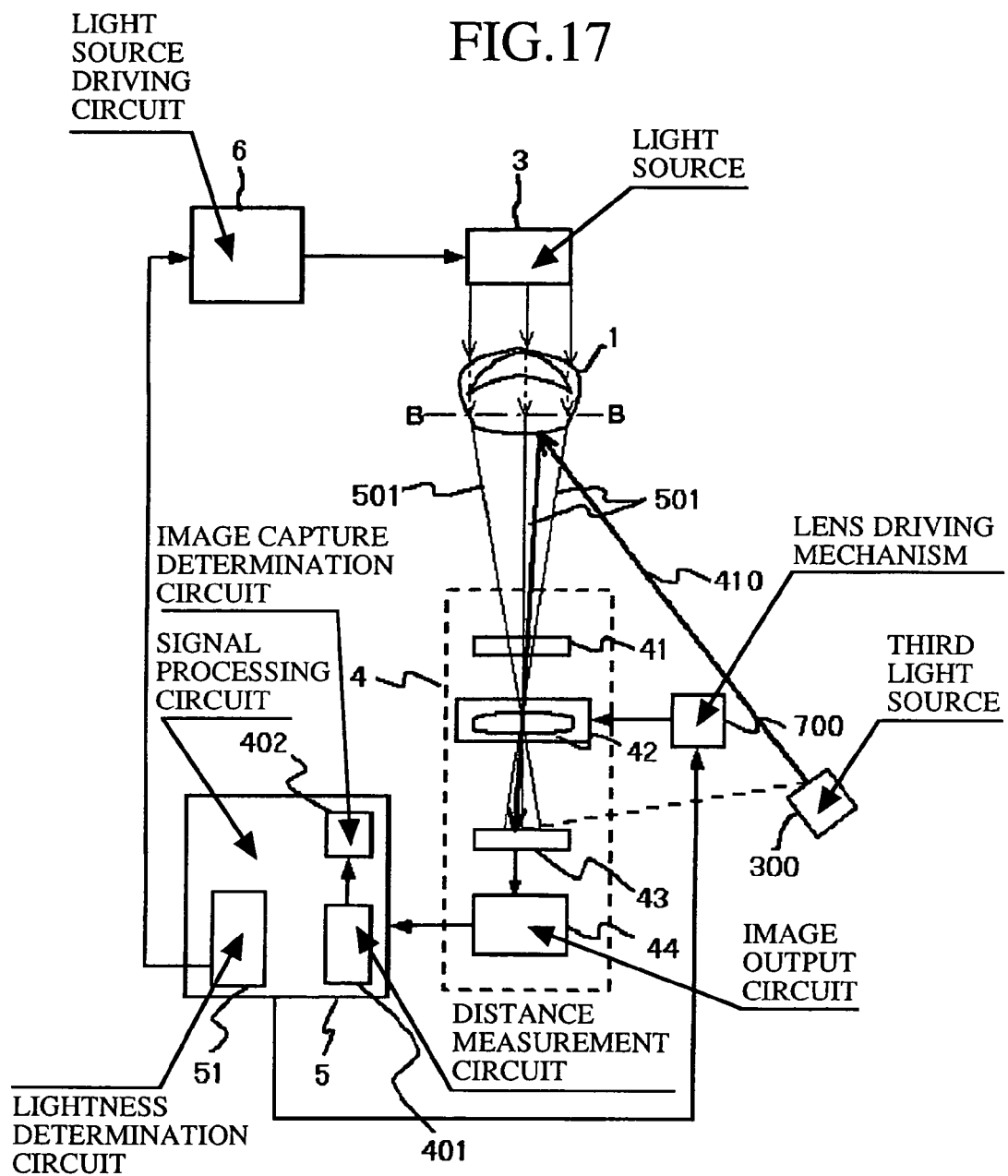
FIG. 17 is a diagram for explaining an identity verification apparatus and a fingerprint image pickup method according to embodiment 8 of the present invention.

FIG. 17 is a diagram for explaining an identity verification apparatus and a fingerprint image pickup method according to embodiment 8 of the present invention. More concretely, FIG. 17 shows a front view of the structure of the whole of the identity verification apparatus. As shown in FIG. 17, the identity verification apparatus according to this embodiment 8 is so constructed as not to deflect light from an observation plane within an object to be detected, like that of above-mentioned embodiment 3. As an alternative, the identity verification apparatus according to this embodiment can be so constructed as to deflect the light from the observation plane by using a plane mirror 100, like that of above-mentioned embodiment 1. A difference between embodiment 7 and this embodiment 8 will be explained hereafter.

While according to above-mentioned embodiment 7 the fingertip 1 which is the object to be detected has to be moved in order to make the focal plane of the image formation lens 42 in agreement with the observation plane within the internal tissues of the fingertip 1, the identity verification apparatus according to this embodiment 8 can make the focal plane of the image formation lens 42 in agreement with the observation plane within the fingertip 1 by using an active auto-focusing technique for applying light to the finger so as to detect the position of the fingerprint side surface of the fingertip, and driving the image formation lens 42 by using a lens driving mechanism 700 so as to make the focal plane of the image formation lens 42 in agreement with the observation plane within the fingertip 1.

Thus, the identity verification apparatus that is thus constructed detects the position of the fingerprint side surface of the fingertip without being contact with the fingerprint side surface of the object to be detected 1, like that of above-mentioned embodiment 7. The same advantage as provided by embodiment 7 is offered.

Embodiment 9

Figure 18:
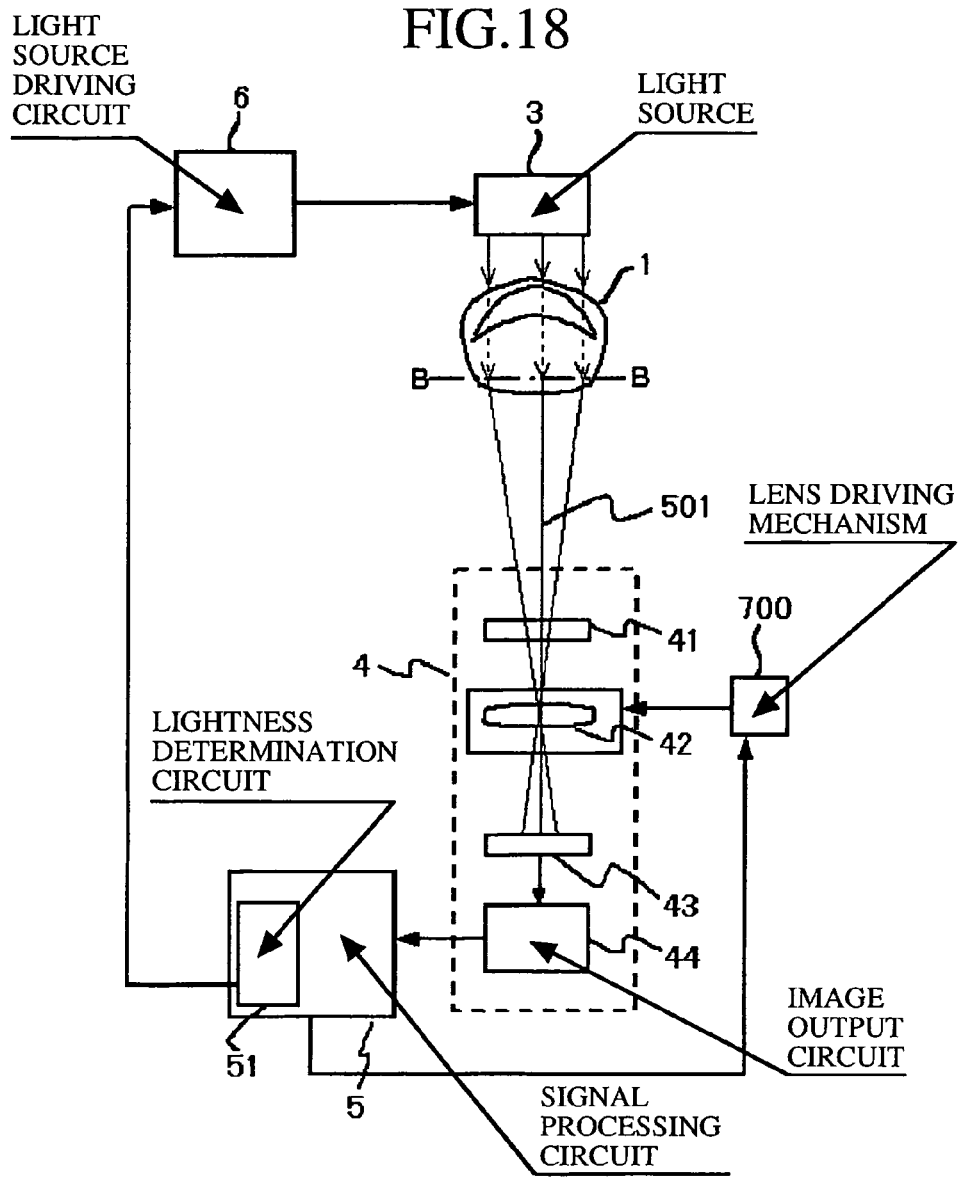
FIG. 18 is a diagram for explaining an identity verification apparatus and a fingerprint image pickup method according to embodiment 9 of the present invention.

FIG. 18 is a diagram for explaining an identity verification apparatus and a fingerprint image pickup method according to embodiment 9 of the present invention. More concretely, FIG. 18 shows a front view of the structure of the whole of the identity verification apparatus. As shown in FIG. 18, the identity verification apparatus according to this embodiment 9 is so constructed as not to deflect light from an observation plane within an object to be detected, like that of above-mentioned embodiment 3. As an alternative, the identity verification apparatus according to this embodiment can be so constructed as to deflect the light from the observation plane by using a plane mirror 100, like that of above-mentioned embodiment 1. A difference between embodiment 8 and this embodiment 9 will be explained hereafter.

In accordance with above-mentioned embodiment 8, the focal plane of the image formation lens 42 is made to be in agreement with the observation plane within the fingertip 1 by using an active auto-focusing technique. In contrast, according to this embodiment, the focal plane of the image formation lens 42 is made to be in agreement with the observation plane within the fingertip 1 by using a passive auto-focusing technique for analyzing the contrast of the fingerprint image picked-up by the image sensor 43' and driving the image pickup lens 42 by using a lens driving mechanism 700 so as to make the focal plane of the image formation lens 42 in agreement with the observation plane within the fingertip 1.

Thus, the identity verification apparatus that is thus constructed detects the position of the fingerprint side surface of the fingertip without being contact with the fingerprint side surface of the object to be detected 1, like those of above-mentioned embodiments 7 and 8. The same advantage as provided by embodiments 7 and 8 is offered. In each of the above mentioned embodiments, the image formation lens 42 is used as an image formation means, as previously explained. A curved surface mirror, a pinhole or the like having an image formation function can be used instead of the image formation lens.

Many widely different embodiments of the present invention may be constructed without departing from the spirit and scope of the present invention. It should be understood that the present invention is not limited to the specific embodiments described in the specification, except as defined in the appended claims.

What is claimed is:

1. A fingerprint formation method comprising:
    passing light through an object including a fingerprint surface having projections and depressions to form a pattern of light including dark portions corresponding to the projections and bright portions corresponding to the depressions due to light transmittance of internal tissues proximate the fingerprint surface;
    forming an image of the pattern of light in a focal plane located, when forming the image, within the object and spaced from at least part of the fingerprint surface;
    generating a fingerprint image from the pattern of light, the fingerprint image including dark portions corresponding to the projections and bright portions corresponding to the depressions;
    smoothing the fingerprint image to produce a smoothed image; and
    generating a difference image by arithmetically determining differences between the fingerprint image and the smoothed image to remove blood vessel images from the fingerprint image.

2. The method according to claim 1, wherein the focal plane is spaced from said fingerprint surface by a distance in a range from 0.1 mm to 1.0 mm when forming the image of the pattern of light.

3. A fingerprint image generating apparatus comprising:
    a light source applying light that can pass through an object including a fingerprint surface having projections and depressions to form a pattern of light;
    an image forming unit detecting the pattern of light formed by the light emitted by the light source and passing though the projections and the depressions of the fingerprint surface, the image forming unit comprising
        an image pickup sensor having a focal plane that is located within the object and spaced from at least part of the fingerprint surface when forming an image, and forming an image of the pattern of light in the focal plane, and
        an image formation unit receiving the image of the pattern of light and generating a fingerprint image including dark portions corresponding to the projections and bright portions corresponding to the depressions; and
    an arithmetic operation unit arithmetically determining a difference between the fingerprint image generated by the image formation and a smoothed image producing by smoothing the fingerprint image to produce a difference image from which blood vessel images in the fingerprint image have been removed.

4. The fingerprint image generating apparatus according to claim 3, comprising an object holding member for holding the object.

5. The fingerprint image generating apparatus according to claim 4, wherein the object holding member includes a through hole passing through the object holding member for passage of the light passing through the object when supported by the object holding member and where the fingerprint surface of the object is not in contact with the object holding member.

6. The fingerprint image generating apparatus according to claim 4, wherein
    the object holding member is a transparent plate for holding the object and contacting the fingerprint surface; and
    a surface of the transparent plate which the fingerprint surface contacts includes an anti-reflective film coating.

7. The fingerprint image generating apparatus according to claim 3, wherein the focal plane is spaced from the fingerprint surface by a distance in a range from 0.1 mm to 1.0 mm when forming the image of the pattern of light.

8. The fingerprint image generating apparatus according to claim 3, wherein the light from the light source has dominant wavelengths in a red or near-infrared region, and the image pickup sensor is responsive to light having wavelengths in the red or near-infrared region.

9. The fingerprint image generating apparatus according to claim 8, wherein the light from the light source has dominant wavelengths ranging from 630 nm to 780 nm, and the image pickup sensor is responsive to light having wavelengths ranging from 630 nm to 780 nm.

10. The fingerprint image generating apparatus according to claim 3 comprising a signal processing unit processing the fingerprint image to generate fingerprint information for verifying an identity based on the fingerprint information.

* * * * *